Nov. 14, 1967  R. E. MORGAN  3,353,085
TIME RATIO CONTROL AND INVERTER POWER CIRCUITS
Filed Feb. 27, 1964  7 Sheets-Sheet 1

Inventor:
Raymond E. Morgan,
by Charles W Helzer
His Attorney.

Inventor:
Raymond E. Morgan,
by Charles W. Helzer
His Attorney.

Inventor:
Raymond E. Morgan,
by Charles W Helzer
His Attorney.

# United States Patent Office 3,353,085
Patented Nov. 14, 1967

3,353,085
TIME RATIO CONTROL AND INVERTER POWER CIRCUITS
Raymond E. Morgan, Schenectady, N.Y., assignor to General Electric Company, a corporation of New York
Filed Feb. 27, 1964, Ser. No. 347,731
22 Claims. (Cl. 321—43)

ABSTRACT OF THE DISCLOSURE

A family of time ratio control D-C power circuits comprise a load current carrying SCR, triac, diac, or dv/dt fired SCR which is turned on and commutated off at desired intervals to supply power to the load through a filter inductance. For inductive loads, a coasting diode is in parallel with the load and filter inductance, and for power generating loads the coasting diode is replaced by a dv/dt fired SCR diode combination, triac or diac and a bi-directional conducting load current carrying means is used to additionally pump power back to the supply. The commutation circuit comprises a commutating capacitor in series with a saturable reactor tuned to series resonance at the commutating frequency, and a blocking circuit renders the gating circuit ineffective during commutating intervals of the commutation circuit. Inverters comprise two cooperating pairs of time ratio control circuits bridge-connected to the load.

---

The present invention relates to a family of new and improved power circuits.

More particularly, the invention relates to a family of power circuits using turn on, non-gate turn off solid state semiconductor controlled conducting devices for power switching and which employ a simple series connected saturable reactor and communicating capacitor commutation scheme. By time ratio control of direct current electric power is meant the chopping up of a direct current electric potential by controlling the on time of a turn on, turn off power switching device connected in circuit relationship with a load and the direct current electric potential. By inversion of direct current electric power to alternating current electric power is meant the switching of a load across alternate output terminals of a direct current electric power supply by appropriately switching a set of turn on, turn off power switching devices connecting the load in circuit relationship with the direct current electric power supply.

In recent years the above described types of power circuits for the most part have employed a solid state semiconductor device known as a silicon controlled rectifier (SCR). The SCR is a four layer PNPN junction device having a gating electrode which is capable of turning on current flow through the device with only a relatively small gating signal. The conventional SCR, however, is a non-gate turn off device in that once conduction through the device is initiated, the gate thereafter loses control over conduction through the device until it has been switched off by some external means where the SCR is being used in conjunction with a direct current power supply. Such external means are generally referred to as commutation circuits, and usually effect turning off of the SCR by reversal of the potential across the SCR. In addition to the SCR, recent advances in the semiconductor art have made available to industry new solid state semiconductor devices which are controlled turn on, non-gate turn off conducting devices capable of operating at power levels, but which are bi-directional conducting devices. By bi-directional conducting devices is meant the device is capable of conducting electric current in either direction through the device. One of these last mentioned devices, referred to as a triac is a gate controlled turn on NPNPN junction device which, similar to the SCR, is a non-gate turn off device that must be turned off by an external communication circuit if it is used in conjunction with a direct current power supply. While the preferred form of a triac is a five layer gate controlled device, it should be noted that four layer PNPN and NPNP junction gate control triac devices are practical as well as other variations, but that in any event the triac characteristics mentioned above are common to all of them. The second newly available power device, referred to as a power diac is a two terminal, five layer NPNPN junction device which like the triac has bi-directional conducting characteristics. In contrast to the SCR and triac, however, the diac is not a gate turn on device, but must be turned on by the application of a relatively steep voltage pulse (high dv/dt) applied across its terminals. It should be noted also that the SCR and triacs may also be fired by the same high dv/dt technique. However, the diac is similar to the SCR and triac in that it too must be turned off by external circuit commutation means when used in conjunction with a direct current power supply. The present invention provides new and improved power circuits employing solid state semiconductor devices having the above described characteristics, and which employ a simple saturable reactor and series connected commutating capacitor commutation scheme.

It is therefore a primary object of the present invention to provide a family of new and improved power circuits employing controlled turn on, non-gate turn off solid state semiconducting devices, and having a simple series connected saturable reactor and commutating capacitor commutation scheme.

Another object of the invention is to provide a new and improved family of power circuits of the above general type which are economical and efficient in operation, and which can provide reliable commutation which is either independent of load or dependent upon the load current supplied through the device.

In practicing the invention, an improved power circuit is provided which uses turn on, non-gate turn off solid state conducting devices and includes in combination a controlled turn on, non-gate turn off bi-directional conducting semiconductor device operatively connected in series circuit relationship with a load across a pair of power supply terminals that in turn are adapted to be connected across a source of electric potential. Commutation circuit means are provided which comprise a saturable reactor and a commutating capacitor connected in series circuit relationship across the turn on, non-gate turn off controlled bi-directional conducting device for commutating off the device at desired intervals, with the commutating capacitor and the saturated inductance of the saturable reactor being tuned to series resonance at a desired commutating frequency. The circuit is completed by gating circuit means operatively coupled to the turn on, non-gate turn off controlled conducting device to cause it to turn on and conduct current therethrough in either one of two directions depending upon the polarity of the potential across the device. With existing control devices, it may be desirable to include in the circuit arrangement a blocking circuit means operatively connected between the gating circuit means and the commutation circuit means for rendering the gating circuit means ineffective during the commutating intervals of the commutation circuit means.

Other objects, features and many of the attendant advantages of this invention will be appreciated more readily as the same becomes better understood by reference to the following detailed description when considered in connection with the accompanying drawings, wherein like parts in each of the several figures are identified by the same reference character, and wherein:

FIGURE 1 is a detailed circuit diagram of one form of a new and improved power circuit constructed in accordance with the invention for use in the time ratio control of direct current electric power, and which employs a conventional silicon controlled rectifier device in conjunction with a triac bi-directional conducting device together with a simple series connected saturable reactor and commutating capacitor commutation scheme;

Figure 1:
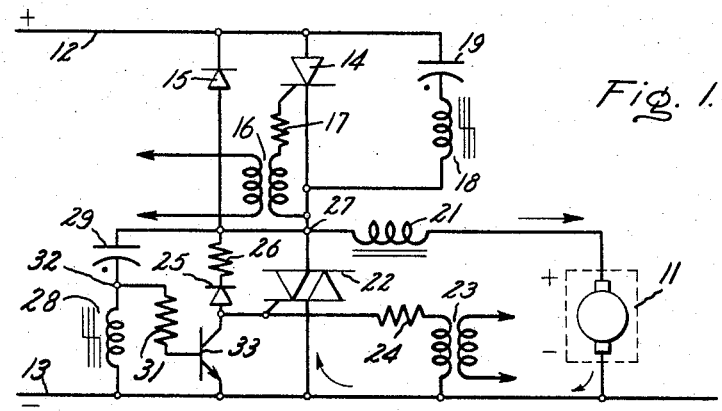

FIGURE 1 of the drawings is a detailed circuit diagram of a time ratio control power circuit constructed in accordance with the invention. For a more detailed description of the technique of time ratio control of direct current electric power, reference is made to an article entitled "Time Ratio Control With Combined SCR and SR Commutation" appearing in IEEE Transaction paper number 63–1448, published Oct. 27, 1963 by R. E. Morgan, the inventor of the present application. In essence, a time ratio control power circuit accomplishes control of the direct current electric power supplied to a load by chopping up the direct current electric supply potential, and subsequently smoothing it with suitable filtering to provide a desired proportional output potential. This is achieved by controlling the on time of a turn on-turn off power switching device connected in circuit relationship with the load and the direct current electric supply potential.

In the time ratio control power circuit of FIGURE 1, a load 11 is connected to a pair of power supply terminals 12 and 13 which in turn are apt to be connected across a direct current power supply as indicated by the plus (+) and minus (−) signs. It should also be noted that the circuit shown in FIGURE 1 as well as those described hereinafter could be employed to proportionately control any desired part of a half cycle of an applied alternating current potential supplied across the terminals 12 and 13. However, for most applications, it will be desirable to use the time ratio control power circuit to proportionally control direct current electric power. The load 11 is connected across the power supply terminals 12 and 13 through a load current carrying turn on-turn off controlled conducting device comprised by a conventional silicon controlled rectifier device (SCR) 14 connected in series circuit relationship with the load 11 across the power supply terminals 12 and 13. The load current carrying SCR 14 has a feedback diode 15 connected in parallel circuit relationship across it, with the feedback diode 15 being connected in a reverse polarity sense relative to SCR 14. That is to say, the cathode or emitter electrode of feedback diode 15 is connected to the anode or collector electrode of SCR 14 and the anode or collector electrode of diode 15 is connected to the cathode or emitter electrode of SCR 14. Gating circuit means are operatively connected to the control gate of SCR 14 for turning on the SCR. This gating circuit means is comprised by a gating transformer 16 having a secondary winding connected through a limiting resistor 17 to the control gate of SCR 14, and having its primary winding coupled to a source of gating signals. For a description of suitable gating signal sources for use with the present power circuits, reference is made to Chapter 4 of the Silicon Controlled Recifier Manual, 2nd Edition, published by the Rectifier Components Dept. of the General Electric Co., Auburn, N.Y.—copyrighted in 1961. Turn off of SCR 14 after it is conducting, is accomplished by commutation circuit means coupled across the SCR 14 and comprised by a saturable reactor 18 and a commutating capacitor 19. The saturable reactor 18 and commutating capacitor 19 are connected in series circuit relationship across SCR 14 with the commutating capacitor 19 and the saturated impedance of the saturable reactor 18 being tuned to series resonance at a desired commutating frequency.

The time ratio control power circuit of FIGURE 1 is further comprised by a filter inductance 21 which is a linear inductance connected in series circuit relationship intermediate the load 11 and SCR 14. A coasting and pumpback triac controlled bi-directional conducting device 22 is connected in parallel circuit relationship with the load 11 and filter inductance 21, and serves both as a coasting rectifier, and as a power pumpback device as will be explained more fully hereinafter. The coasting and pumpback triac 22 has a gating circuit means operatively coupled to its control gate which is comprised by a gating transformer 23 having a secondary winding connected through a limiting resistor 24 to the control gate of triac 22. In addition, the control gate of triac 22 is connected through a blocking diode 25 and limiting resistor 26 back to a juncture point 27. The junction 27 is a common junction point to which the negative load terminal or emitter electrode of SCR 14, one terminal of filter inductance 21, and one load terminal of the triac 22 are all connected. Second commutation circuit means are provided for the triac 22 which comprise a second saturable reactor 28 and commutating capacitor 29 connected in series circuit relationship between the power supply terminal 13 and the juncture point 27, and hence, connected across the triac device 22. Blocking circuit means are provided which interconnect the second commutation means with the gating circuit means for the triac 22. This blocking circuit means is comprised by a limiting resistor 31 connected to the juncture 32 of the commutating capacitor 29 and saturable reactor 28 and to the base of an NPN junction transistor 33. The NPN junction transistor 33 has its emitter electrode connected to the power supply terminal 13 and its collector electrode connected directly to the gate of the triac device 22.

The triac 22 is a gate turn on, non-gate turn off, bi-directional conducting device which has been recently introduced to the electrical industry by the Rectifier Components Dept. of the General Electric Company, Auburn, N.Y. Similar to the conventional SCR, the triac may be switched from a high impedance blocking state to a low impedance conducting state when a low voltage gate signal is applied between the gate terminal and one of the load terminals. Also, like the SCR, once the triac is switched to its low impedance conducting state, the gate electrode loses control and current flow through the device must be interrupted by some external means when the gate signal is removed in order to return the triac to its high impedance blocking state. Unlike the SCR, however, a further characteristic of the triac 22 is that once it is gated on, it will conduct current through the device in both directions depending upon the polarity of the potential applied across the triac. For a more detailed description of the triac gate turn on, non-gate turn off solid state semiconductor device, reference is made to an article entitled "Bilateral SCR Lets Designers Economize on Circuitry" by E. K. Howell appearing in the Jan. 20, 1964 issue of Electronic Design magazine.

In operation, the time ratio control power circuit of FIGURE 1 operates in the following manner. Considering the circuit of FIGURE 1 in its quiescent condition when the load current carrying silicon controlled rectifier 14 is in its non-conducting or blocking condition, then the commutating capacitor 19 will be charged to essentially the full potential of the direct current power supply connected across the terminals 12 and 13. In charging the commutating capacitor 19, the saturable reactor 18 will be driven into its positive condition of saturation such that any potential across it must be positive at the dot end in order to maintain the reactor in its saturated condition. Upon SCR 14 being turned on by the application of a gating signal pulse supplied through the gating transformer 16 to its control gate, the potential of the juncture point 27 will go essentially to the full positive value of the direct current power supply connected across the terminals 12 and 13. Upon this occurrence, the saturable reactor 18 will be driven out of positive saturation towards negative saturation, and for the period of time that it is unsaturated, it will hold off the potential of the commutating capacitor 19 so that capacitor 19 remains charged to the same polarity and potential as when the circuit was in its quiescent condiiton. During this interval of time, load current is supplied to the load 11 through the conducting SCR 14. Thereafter, upon the saturable reactor 18 being driven into negative saturation so that its impedance drops essentially to zero, the charge on the commutating capacitor 19 will be oscillated through the closed series loop comprised by the saturated impedance of the saturable reactor 18, SCR 14 and commutating capacitor 19 to reverse the polarity of the charge on the commutating capacitor 19 so that the dot side of capacitor 19 is now positive with respect to the positive terminal 12. Since the juncture point 27 is at the same potential as the terminal 12, this reversal of the polarity of the charge on commutating capacitor 19 reverses the polarity of the potential across the saturable reactor 18 so that it is again driven out of negative saturation back towards positive saturation. Then for another interval of time while the saturable reactor 18 is unsaturated, the SCR 14 continues to conduct and to supply load current to the load 11. Thereafter, upon the saturable reactor 18 again being driven into positive saturation, its impedance again drops essentially to zero so that the charge on the commutating capacitor 19 is applied directly to the juncture point 27 and results in driving the potential of this point to essentially twice the value of the direct current power supply potential. This results in reversing the polarity of the potential across the silicon controlled rectifier 14 thereby causing it to turn off and return to its blocking condition.

At the instant of time that the SCR starts to cut off, the potential at the junction point 27 is positive with respect to the power supply terminal 12 so that feedback diode 15 is rendered conductive and will feed back current to the power supply. Feedback diode 15 continues to conduct until capacitor 19 is sufficiently discharged, both by supplying load current to the load 11 and by feedback of current to the power supply through diode 15, to lower the potential of the junction 27 below the potential of the power supply 12. At this point feedback diode 15 cuts off, and SCR 14 has become fully blocking due to the reverse bias placed across it by reason of the forward voltage drop across feedback diode 15. Thereafter, the load current which was being supplied to load 11 first through SCR 14 and then by the commutating capacitor 19 starts to fall off. However, due to the fact that the previously supplied load current flowing through the filter inductance 21 has charged the filter inductance, and has created lines of magnetic flux which thread the turns of this linear inductance, these collapsing lines of flux will generate in the turns of the filter inductance 21 on electromotive force which will attempt to continue to supply load current through the load 11. This results in driving the junction point 27 negative with respect to the terminal 13 so that a gating potential is applied through the limiting resistor 26 and gating diode 25 to the gate electrode of the triac device 22. This in turn results in turning on the triac device 22 and causes it to operate as a coasting rectifier so as to circulate the load current generated by the filter inductance 21 through the load 11 in a conventional coasting rectifier manner. Upon the filter inductance 21 being sufficiently discharged, the potential of the juncture point 27 again goes positive with respect to supply terminal 13 thereby reversing the polarity of the potential across triac 22, and causing it to automatically turn off and return to its blocking condition. The circuit is then ready to initiate a new cycle of operation by application of a gating signal pulse to the control gate of SCR 14. Repeated cycles of operation produces an essentially smooth direct current electric potential across the load 11 the absolute value of which is some proportional part of the potential direct current power supply connected across the supply terminals 12 and 13 as determined by the timing of the intervals of conduction of the SCR 14.

When operating the circuit shown in FIGURE 1 in the above described mode, load current is supplied to the load 11. It is possible to operate the circuit of FIGURE 1 in a different mode of operation where the load 11 might for instance be a trolley car or other electrically operated vehicle which is coasting downhill, and the load 11 is operating as a generator. With the load 11 operating as a generator, it would be desirable to pump the power generated by the load 11 back into the direct current power supply for purposes of economy. When operating under these conditions, the SCR 14 is maintained in its blocking condition, and the coasting triac 22 is periodically gated on by a gating signal pulse supplied through the gating transformer 23 to the control gate thereof. The coasting triac 22 is commutated off at periodic intervals by the operation of the second commutation circuit means comprised by the saturable reactor 28 and commutating capacitor 29. The second commutation circuit means functions in precisely the same manner as described with relation to the first commutation circuit means comprised by the series connected saturable reactor 18 and commutating capacitor 19 to commutate off the triac device 22 in a manner known as Morgan commutation.

During the commutation interval of the second commutation circuit means comprised by the saturable reactor 28 and commutating capacitor 29 it is desirable that the gating circuit means connected to the control gate of the triac device 22 be rendered ineffective and for this purpose the blocking circuit means comprised by resistor 31 and the NPN junction transistor 33 is provided. During most of the period of operation of the coasting triac device 22, and while it is in its quiescent blocking condition, a negative potential exists on the dot side of the commutating capacitor 29 which is coupled through the limiting resistor 31 to the base of the NPN junction transistor 33 to maintain this transistor in its nonconducting or blocking condition. Hence, transistor 33 will appear normally as an open circuit during most of the operation of the circuit of FIGURE 1 as described above. However, during the commutation intervals of the second commutation circuit means comprised by saturable reactor 28 and commutating capacitor 29, upon the polarity of the charge on the commutating capacitor 29 being reversed so that the dot side of the capacitor is positive with respect to the junction point 27, the NPN junction transistor 33 will be turned on full. This results in clamping the gate of the coasting triac device 22 to the same potential as the supply terminal 13. As a consequence of this clamping action, no relative gating potential can exist between the gate and the load terminal of the triac device 22 which is connected to the supply terminal 13 thereby rendering ineffective the gating circuit means during the commutation interval so as to assure a commutation off of the coasting triac device 22 in the pumpback coasting direction by the second commutation circuit means.

Each time that the coasting triac 22 is gated on by the gating signals supplied through gating transformer 23, the filter inductance 21 will be charged with current from the load generator 11. Upon the coasting triac 22 being commutated off by the commutation circuit means comprised by commutating capacitor 29 and saturable reactor 28 a potential will be developed across the filter inductance 21 due to the collapsing lines of magnetic flux which potential will be added to the potential of the load generator source 11, and results in driving the potential of the junction point 27 sharply positive with respect to the potential of the positive terminal 12. Accordingly, the feedback diode 15 will be rendered conductive and will supply current back to the power supply source connected across the supply terminals 12 and 13. Current will then be fed back from the load generator 11 and filter inductance 21 until such time that the filter inductance 21 is discharged sufficiently to allow the feedback diode 15 to again resume its nonconducting or blocking condition. Upon this occurrence, the coasting and pumpback triac 22 can again be gated on by a gating signal pulse supplied through the gating transformer 23 to its control gate to initiate another cycle of operation. It should be noted that the coasting triac 22 should never be gated on during the interval of time that the diode 15 is still conducting otherwise there will be a dead short across the power supply terminals 12 and 13.

From the above description, it can be appreciated that by reason of the bi-directional conducting characteristics of the triac device 22, the circuit of FIGURE 1 can be operated in either one of two modes to supply current to the load 11, or to feed current generated by the load 11 back to the power source as determined by the conditions of operation of the load 11. It therefore can be appreciated that the circuit of FIGURE 1 makes available a highly efficient time ratio control power circuit for use in controlling the traction motors of electrically operated vehicles, for example. The circuit is efficient and economical in operation, and by reason of the inclusion of the simple series connected saturable reactor and commutating capacitor commutation scheme, is relatively inexpensive to manufacture.

Figure 2:
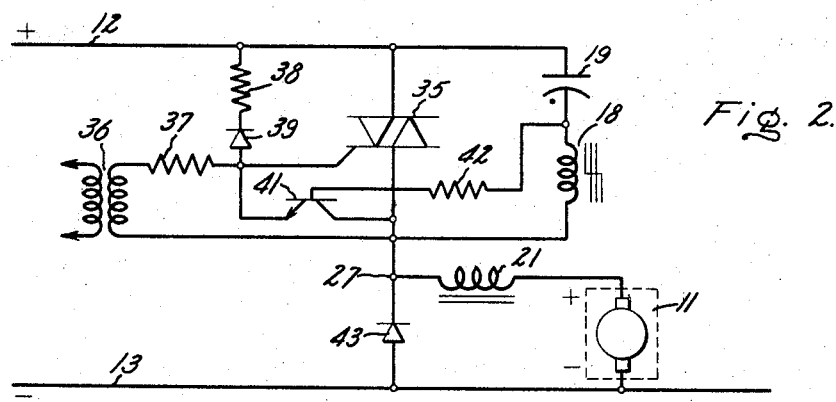
FIGURE 2 is a detailed circuit diagram of a second form of time ratio control power circuit employing a triac bi-directional conducting device and conventional coasting diode together with the simple saturable reactor-commutating capacitor commutation scheme.

FIGURE 2 of the drawings illustrates a different form of new and improved time ratio control power circuit constructed in accordance with the invention. In the embodiment of the invention shown in FIGURE 2 of the drawings, a load current carrying triac bi-directional conducting device 35 is provided, and is connected in series circuit relationship with the load 11 and filter inductance 21 across a pair of power supply terminals 12 and 13. The load current carrying triac device 35 has its control gate operatively coupled to a source of gating signals through a gating transformer 36 whose secondary winding is connected through a limiting resistor 37 to the control gate of triac 35. The gating circuit means is further comprised by a coupling diode 39 and a limiting resistor 38 connected between the control gate of triac 35 and the positive supply terminal 12 which is connected to one of the load terminals of the triac 35. Commutation circuit means are provided which are comprised by a saturable reactor 18 and commutating capacitor 19 that are tuned to series resonance at a desired commutating frequency, and are connected in series circuit relationship across the load current carrying triac device 35. Blocking circuit means interconnect the commutation circuit means and the gating circuit means for rendering the gating circuit means ineffective during the commutation intervals of the commutation circuit means. This blocking circuit means is comprised by a limiting resistor 42 having one terminal connected to the juncture of the commutating capacitor 19 and commutating saturable reactor 18, and having its remaining terminal connected to the base of an NPN junction transistor 41. The emitter electrode of the NPN junction transistor 41 is directly connected to the control gate of the triac device 35, and the collector electrode of NPN junction transistor 41 is connected to that load terminal of triac device 35 which is connected to the common junction point 27. To complete the circuit, a conventional coasting rectifier 43 is connected in parallel with the load 11 and filter inductance 21.

The circuit of FIGURE 2 is intended for use with applications where the load 11 is a highly inductive load, and may tend to drive the potential of the junction point 27 highly positive with respect to the potential of the positive terminal 12. In operation, the circuit of FIGURE 2 functions in a manner similar to the circuit of FIGURE 1 during the intervals that the circuit supplies load current to load 11 as described hereinafter. With the circuit in its quiescent condition, the commutating capacitor 19 is charged to essentially the full potential of the direct current power supply through the saturable reactor 18 so that saturable reactor 18 is driven into positive saturation at its dot end. Upon the load current carrying triac device 35 being turned on by the application of a gating signal pulse supplied through the gating transformer 36 to its control gate, the potential of the junction point 27 goes to essentially the potential of the positive power supply terminal 12. This results in reversing the polarity of the potential across the saturable reactor 18 so that it is driven into negative saturation, reverses the charge on the commutating capacitor 19 in the manner previously described with respect to the circuit shown in FIGURE 1, and again driven back into positive saturation. During this whole interval, load current is being supplied through the triac device 35 to load 11. Upon the saturable reactor 18 again reaching positive saturation, the charge on the commutating capacitor 19 which is now positive at its dot side with respect to the positive terminal 12, is applied directly to the junction point 27 due to the essentially zero impedance of the saturated inductance of saturable reactor 18. Hence, junction point 27 is driven highly positive with respect to the positive terminal 12. This, of course, results in reversing the polarity of the potentials across the triac device 35 and causes it to turn off in the load current direction.

Concurrently, with the turn off of triac 35 in the load current direction the positive potential of the junction point 27 is coupled back through the secondary winding of the gating transformer 36, resistor 37, coupling diode 39 and resistor 38 to cause the triac device 35 to be gated on in its reverse or feedback current conducting direction. Conduction through the triac device 35 takes place through what are essentially parallel paths so that the conduction through the reverse feedback path when the polarity of the potentials across triac device 35 are such that the point 27 is positive with respect to the terminal 12, has the effect of back biasing the previous load current conduction path through the device in the manner of the feedback diode 15. This results in causing the load current conducting path to be returned to its nonconducting condition and assume a blocking condition. Conduction through the triac device 35 then continues in the reverse or feedback direction for the interval of time required to discharge the commutating capacitor 19 sufficiently to allow the potential of the junction point 27 to again go negative with respect to the terminal 12. At this time the polarities of the potential across the triac device 35 are again reversed so that conduction through the triac device 35 in the reverse feedback direction is automatically cut off returning the device to its fully blocking condition. During the interval of time required to return triac 35 to its fully blocking condition, load current is supplied to load 11 by the commutating capacitor 19.

Upon the triac device 35 being rendered fully blocking, discharge of the filter inductance 21 turns on the coasting rectifier 43 to continue to supply load current to the load 11 in the previously described manner. Thereafter, upon the filter inductance 21 being fully discharged so that the juncture of the point 27 again goes positive with respect to the supply terminal 13, coasting rectifier 43 is returned to its nonconducting or blocking condition thereby returning the circuit to its completely quiescent condition and completing one cycle of operation. Continued cycles of operation will then supply load current to the load 11 at a value determined by the timing of the gating signal pulses supplied to the load current carrying triac device 35 by the gating transformer 36.

During the commutation intervals of the load current carrying triac 35, the blocking circuit means comprised by the NPN junction transistor 41 and resistor 42 operate to assure that no gating potential will exist between the gate of the triac 35 and the junction point 27. This blocking circuit means in effect renders the gating circuit means ineffective during the commutation interval by clamping the potential of the gate to the potential of the point 27 thereby assuring that no gate potential relative to the load terminal of triac 35 connected to junction point 27, can be developed across the triac device 35. This is achieved by connecting the resistor 42 to the juncture of the commutating capacitor 19 and the saturable reactor 18. As a consequence of this connection, at the point during the commutation interval when the charge on the commutating capacitor 19 is reversed so that its potential is positive at the dot side with respect to the supply terminal 12, the NPN junction transistor 41 will be turned full on so that in effect the gate of the triac 35 is clamped to the potential of the junction point 27. By this means, it is assured that no relative potential will exist between the gate of the triac device 35 and the junction point 27. Hence, upon the potential of the junction point 27 being driven sharply positive with respect to the power supply terminal 12 to reverse the polarity of the potentials across the triac device 35, there is no danger of gating on the device in the load current direction, and turn off of the device in the load current direction is assured. However, it is desirable that a gating potential be applied between the gate and the now negative load terminal of triac device 35 which is connected to the power supply terminal 12 to turn the device on in the reverse feedback direction. This occurs as previously described due to conduction through the coupling diode 39 and the limiting resistor 38 so that of course the triac device 35 is rendered conductive in a reverse direction and functions as the feedback diode. Reverse feedback current flow through the triac device 35 then will reverse bias the previously conducting load current path through triac 35 to assure turn off of this path of conduction in a manner similar to the conventional feedback diode. Subsequently, during turn off of the triac device 35 in the reverse conducting direction, that is at the point in time when the potential of the junction point 27 again goes negative with respect to the power supply terminal 12, no special precautions are required since the coupling diode 39 automatically will return to its blocking condition to remove any possible source of gating potential from the gate of the triac device 35.

Figure 3:
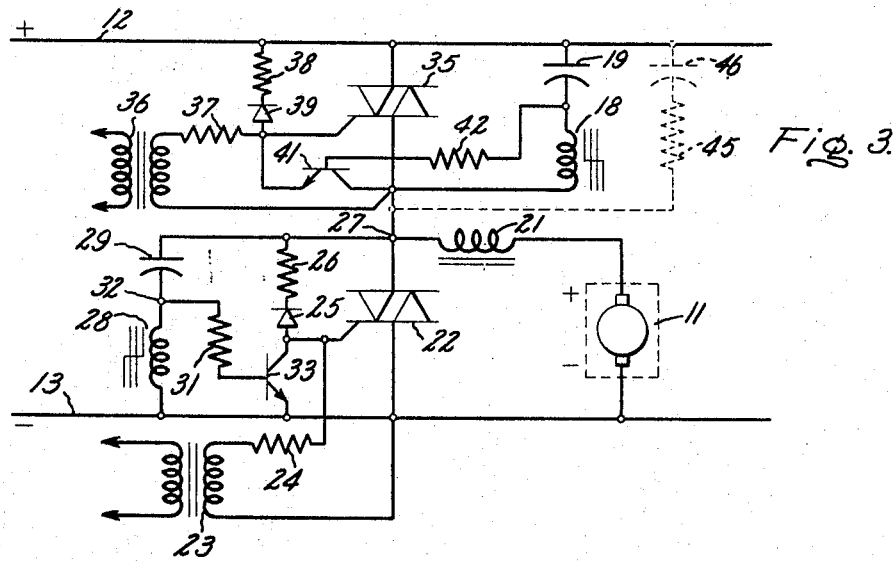
FIGURE 3 is a detailed circuit diagram of an all triac version of a time ratio control power circuit using the simple SR–C commutating scheme.

FIGURE 3 of the drawings illustrates an all triac version of a time ratio control power circuit constructed in accordance with the invention. In the circuit arrangement of FIGURE 3, a load current carrying triac bi-directional conducting device 35 is connected in series circuit relationship with a load 11 and a filter inductance 21 across a pair of power supply terminals 12 and 13. A coasting and pump-back triac bi-directional conducting device 22 is connected in parallel circuit relationship with the filter inductance 21 and the load 11. In operation, the load current carrying triac bi-directional conducting device 35 operates in an identical fashion to the load current carrying triac bi-directional conducting device 35 of the circuit arrangement shown in FIGURE 2, and hence will not be again described in detail. Similarly, the coasting and pumpback triac bi-directional conducting device 22 operates in an identical fashion to the coasting and pumpback triac bi-directional conducting device 22 of the circuit arrangement shown in FIGURE 1, and hence will not be again described in detail. It should be noted, however, that there may be some intercoupling effects wherein upon the coasting and pumpback triac device 22 being gated on and commutated off, a high rate of rise of re-applied voltage across the load current carrying triac device 35 may cause it to be inadvertently turned on by a phenomena known as dv/dt firing. To avoid any such occurrence, it is possible to include circuit means for isolating dv/dt effects on the two triac devices. This circuit means can comprise a voltage limiting resistor 45 and capacitor 46 connected in series circuit relationship across the load current carrying triac device 35. Other similar techniques for isolating the two circuits include two isolating capacitors connected in series circuit relationship across power supply terminals 12 and 13 and having their juncture point connected to the junction point 27. With either arrangement, the isolating circuit means serves to cushion or decrease the rate of rise of reapplied voltage across the blocking triac device so as to avoid the dv/dt firing of the device.

To summarize the operation of the circuit of FIGURE 3, it should be noted that during the mode of operation wherein load current is supplied to the load 11, the gating transformer 36 serves to turn on the load current carrying triac device 35, and the commutation circuit means comprised by the saturable reactor 18 and commutating capacitor 19 turns off the device in the load current direction. If feedback to the direct current power supply is required at the instant of commutation, the diode 39 and resistor 38 will turn on the triac device 35 in the reverse feedback current direction so that it will operate as a feedback device. Subsequently, upon the triac device 35 returning to its fully blocking condition, the coasting and pumpback triac device 22 will be turned on by the coupling diode 25 and resistor 26 to cause it to function in the manner of a coasting diode, and circulate current generated in filter inductance 21 to load 11 in the previously described manner. During the mode of operation of the circuit of FIGURE 3 when the load 11 is operating as a generator, the coasting and pumpback triac device 22 will be gated on by gating signal pulse supplied through the gating transformer 23, and will be commutated off by the commutation circuit means comprised by saturable reactor 28 and commutating capacitor 29. The rapid turning on and off of coasting and pumpback triac device 22 causes the potential at the junction point 27 to go positive with respect to the supply terminal 12. Upon this occurrence the diode 39 turns on the load current triac bi-directional conducting device 35 in its reverse feedback current direction, in order to allow current generated by the load 11 to be fed back into the direct current power supply connected across the supply terminals 12 and 13. Isolation between the two triac devices 22 and 35 is accomplished by circuit means such as the limiting resistor 45 and capacitor 46.

Figure 4:
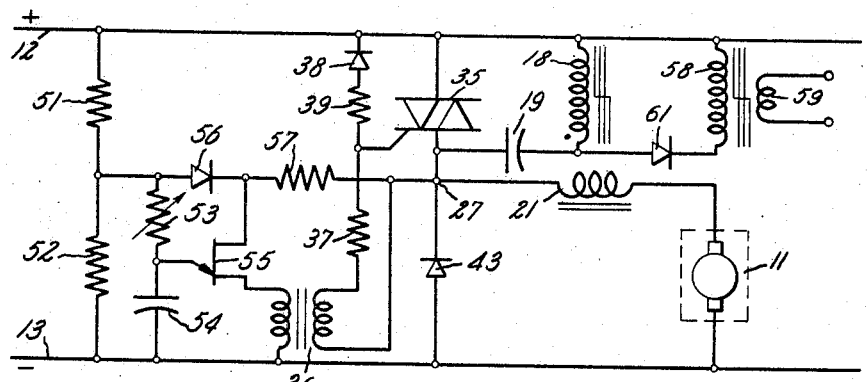
FIGURE 4 is a detailed circuit diagram of a still different form of triac and conventional coasting diode time ratio control power circuit using an on time control of the series connected saturable reactor-commutating capacitor commutation scheme in conjunction with lockout control for the gating of the triac.

FIGURE 4 of the drawings shows still a different form of time ratio control power circuit constructed in accordance with the invention. The circuit arrangement of FIGURE 4 provides for on time control of the commutation circuit means as well as lockout control for the gating circuit means during the commutation interval. The circuit arrangement of FIGURE 4 is comprised by a load current carrying triac bi-directional conducting device 35 connected in series circuit relationship with a load 11 and a filter inductance 21 across a pair of power supply terminals 12 and 13 which in turn are adapted to be connected across the source of electric potential. A conventional coasting rectifier 43 is connected in parallel circuit relationship with the load 11 and the filter inductance 21. Gating circuit means are operatively coupled to the control gate of the load current carrying triac device 35 and comprise a pair of voltage dividing resistors 51 and 52 connected across the power supply terminals 12 and 13. The mid tap point of the voltage dividing resistors 51 and 52 is connected through a variable resistor 53 and capacitor 54 to the terminal 13. The juncture of the variable resistor 53 and capacitor 54 is connected to the emitter electrode of a uni-junction transistor 55 which has one of its base electrodes connected to the primary winding of a gating transformer 36 having its secondary winding connected through the limiting resistor 37 to the control gate of the load current carrying triac 35. The remaining base electrode of the uni-junction transistor 55 is connected to the juncture of a blocking diode 56 and limiting resistor 57 which are connected in series circuit relationship between the mid tap point of the voltage dividing resistors 51 and 52 and the junction point 27. The junction point 27 is the point to which one terminal of coasting rectifier 43 is connected in common with one terminal of the filter inductance 21, along with one of the load terminals of the load current carrying triac device 35, and one terminal of the series connected commutation circuit means comprised by saturable reactor 18 and commutating capacitor 19. The gating circuit means is completed by a coupling diode 38 and the limiting resistor 39 connected between the control gate of the load current carrying triac device 35 and the power supply terminal 12 which is directly connected to one of the load terminals of the triac device 35.

The commutation circuit means for the load current triac device 35 of FIGURE 4 is comprised by a saturable reactor 18 and a commutating capacitor 19 connected in series circuit relationship across the load current carrying triac device 35 between the power supply terminal 12 and the junction point 27. A second saturable reactor 58 which is inductively coupled to a control winding 59 is operatively connected in parallel circuit relationship with the first saturator reactor 18 through the medium of a blocking diode 61. The function of this second saturable reactor 58 will be understood more fully hereinafter upon completion of a description of the operation of the circuit.

The operation of the circuit arrangement of FIGURE 4 is as follows. Considering the circuit to be in its quiescent condition where the load current carrying triac device 35 is fully blocking then the commutating capacitor 19 will be charged essentially to the full potential of the direct current power supply through the saturable reactor 18. This serves to drive the saturable reactor 18 into negative saturation where in order to maintain the reactor in its negative saturation condition the potential across it must be negaitve at the dot end of the reactor. No charging takes place through the second saturable reactor 58 due to the fact that the blocking diode 61 prevents it. However, a control current supplied through the control winding 59 will set the second saturable reactor 58 to some predetermined condition of saturation as determined by the amount of control current flowing in the control winding 59. Ordinarily, due to a previous cycle of operation, the second saturable reactor 58 will be set at some intermediate point on its major hysteresis loop, and will be in the process of being driven towards negative saturation at its dot end by the control current in the control winding 59. With the circuit of FIGURE 4 in this condition, a gating on signal pulse is applied to the control gate of the load current carrying triac device 35 through the gating transformer 36.

The gating on signal pulse applied to the control gate of the load current carrying triac device 35 from the gating on transformer 36 is developed by the gating circuit comprised by the variable resistor 53 and charging capacitor 54 in conjunction with uni-junction transistor 55. This gating on signal pulse is developed as a result of the charging of the capacitor 54 to a sufficiently positive value through the variable resistor 53, which can be adjusted to control the rate of charging of the capacitor 54. Upon the potential of capacitor 54, and hence the emitter electrode reaching a predetermined value relative to the potentials of the base electrodes, the uni-junction transistor 55 will be turned full on so as to produce a current flow through the primary winding of the gating transformer 36 and results in applying a gating on pulse to the gate electrode of the triac device 35. Upon the load current carrying triac device 35 being turned on, the potential of the junction point 27 goes to essentially the potential of the positive terminal 12 so that the blocking diode 56 blocks and raises the potential of the base electrode of the uni-junction transistor 55 to such a high value that the uni-junction transistor 55 cannot be again turned on. In this manner, the production of a further gating pulse across the primary winding of the gating transformer 36 is locked out.

Concurrently with the above described action, turn on of the load current carrying triac device 35 causes the potential at the dot end of the saturable reactor 18 to go to essentially twice the potential of the direct current power supply so that the saturable reactor 18 is driven out of negative saturation back towards positive saturation. Concurrently, it should be noted that this potential is applied through diode 61 to the second saturable reactor 58 to start driving saturable reactor 58 towards positive saturation. Since as previously mentioned, the core of the second saturable reactor 58 is at some intermediate point in its major hysteresis loop as determined by the value of the control current in the control winding 59, the second saturable reactor 58 will reach positive saturation at some predetermined time interval prior to the first saturable reactor 18 being driven into positive saturation. Upon the second saturable reactor 58 reaching positive saturation, the charge on the commutating capacitor will be oscillated through the closed series circuit loop comprised by commutating capacitor 19, diode 61, triac 35 and the saturated impedance of saturable reactor 58 which is series tuned with the commutating capacitor 19 to the desired commutating frequency to thereby reverse the polarity of the charge across the commutating capacitor 19. This reversal of the polarity of the charge on the commutating capacitor 19 makes the plate thereof connected to the junction point 27 positive with respect to the terminal 12. This causes the blocking diode 61 to be rendered blocking, and to start driving the first saturable reactor 18 back towards negative saturation. It should be noted that during the occurrences described above, the first saturable reactor 18 has been allowed to trace out only a minor hysteresis loop as determined by the setting of the control current in the control winding 59. During the entire period that the first saturable reactor 18 is in an unsaturated condition, that is while it is being driven towards positive saturation and then back toward negative saturation, the load current carrying triac device 35 remains conducting, and supplies load current to the load 11. However, upon the first saturable reactor 18 reaching negative saturation again, its impedance drops essentially to zero so that the reversed polarity charge across the capacitor 19 is connected across the load current carrying triac device 35, and drives the potential of the terminal point 27 positive with respect to the terminal 12.

Upon the potential of the junction point 27 being driven positive with respect to the terminal 12, two things happen. One result is to reverse the polarity of the potentials across the load current carrying triac device 35, and cause it to start to turn off current flow through the device in the load current conducting direction. Load current to the load 11 will then be supplied by the commutating capacitor 19 during the commutation interval while the load current carrying triac device 35 is in the process of turning off, and returning to its blocking condition in the load current conducting direction. In the event that the load 11 is a highly inductive load so that the potential of the junction point 27 is driven quite positive with respect to the potential of the supply temrinal 12, a gating signal will be developed across the resistor 39 through coupling diode 38 which gates on the triac device 35 in its reverse feedback current direction so that it operates as a feedback diode. Upon the triac device 35 being turned on in its reverse feedback current direction, the potential through the device in the reverse current direction reversely biases the section of the device carrying current in the load current direction so that it is assured that the device returns to its fully blocking condition in the load current direction. Thereafter, the triac device 35 continues to conduct in the reverse feedback current direction for the period of time required to return the potential of the junction point 27 to a value less than the potential of the terminal 12 at which time the potentials across the triac device 35 will again be reversed, and the device turns fully off and returns to its fully blocking condition. At this same instant, load current will continue to be supplied to load 11 from the filter inductance 21 through the coasting rectifier 43 in the previously described manner until such time that the filter inductance 21 is discharged. Upon filter inductance 21 being discharged, the circuit is returned to its fully quiescent condition thereby completing one cycle of operation, and is in condition to commence a new cycle of operation.

It should be noted that during the entire commutation interval while the potential of the junction point 27 is positive with respect to the supply terminal 12, this positive potential is coupled through the resistor 57 to maintain the diode 56 in a fully blocking condition. This results in elevating the potential of the base electrode of the uni-junction transistor 55 connected to the juncture of the blocking diode 56 and resistor 57 to a value such that the uni-junction transistor 55 cannot be turned on. Upon the potential of the juncture point 27 being returned to a value less than the supply terminal 12, this condition no longer exists, and the diode 56 can conduct thereby allowing the potential of the base terminal of the uni-junction transistor 55 to return to a value such that it can be fired by the potential across the capacitor 54 as determined by the setting of the variable resistor 53. This results in returning the circuit to a condition where it is possible to initiate a new cycle of operation by the generation of a gating on signal pulse through the uni-junction transistor 55 and gating transformer 36. It should be noted, however, that the R-C time constant of the gating circuit must be so adjusted that coasting diode 43 returns to its blocking condition prior to triac 35 being gated on again. From the preceding description it can be appreciated that the invention makes available a new and improved time ratio control circuit employing a single triac bi-directional conducting device in place of the conventional SCR and its feedback diode, and employs a simple series connected commutating capacitor-saturable reactor commutation scheme together with a control saturable reactor providing excellent control over the on time periods of the load current carrying triac device.

Figure 5:
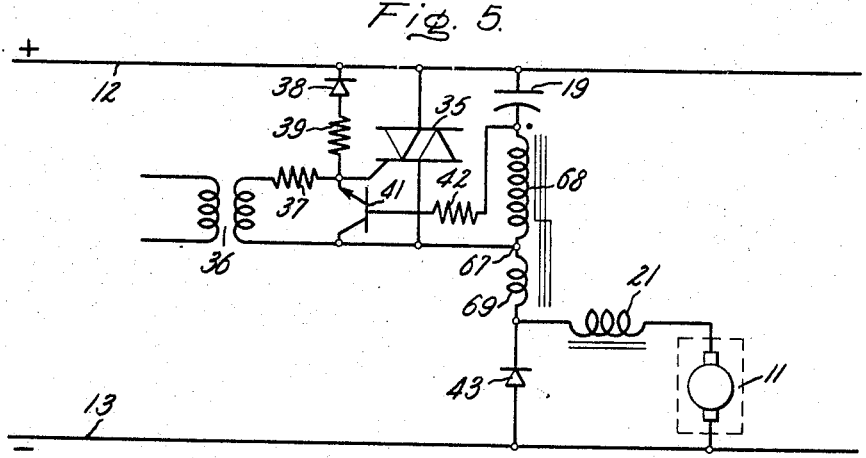
FIGURE 5 is a detailed circuit diagram of still a different form of triac-coasting diode time ratio control power circuit employing a simple saturable reactor-commutating capacitor commutation scheme together with charging of the commutating capacitor to a value dependent upon the load current.

FIGURE 5 of the drawings shows still a different version of a time ratio control power circuit constructed in accordance with the invention wherein charging of the commutating capacitor 19 is dependent upon the value of the load current being supplied to the load. In the circuit arrangement of FIGURE 5, a load 11 is connected in series circuit relationship with a filter inductance 21 and a load current carrying triac bi-directional conducting device 35 across a pair of power supply terminals 12 and 13 that in turn are adapted to be connected across a source of electric potential. The circuit is in many respects similar to the circuit shown in FIGURE 2 with the exception, however, in the construction of the commutation circuit means. The commutation circuit means of the FIGURE 5 circuit arrangement is comprised by a commutating capacitor 19 and a saturable reactor portion 68 connected in series circuit relationship across the load current carrying triac bi-directional conducting device 35. The circuit is designed in such a manner that the saturated inductance of saturable reactor portion 68 and commutating capacitor 19 are tuned to series resonance at a desired commutating frequency. The saturable reactor portion 68 is inductively coupled to a saturable reactor winding 69 which is connected in series circuit relationship intermediate the load current carrying triac bi-directional conducting device 35 and filter inductance 21. In all other respects, regarding the construction and operation of the gating circuit means 36–39 and the blocking circuit means 41 and 42, the circuit of FIGURE 5 is similar to the circuit arrangement of FIGURE 2, and operates in the same manner.

With regard to the manner of operation of the commutation circuit means of the FIGURE 5 arrangement, it should be noted that with the circuit of FIGURE 5 in its fully turned off quiescent condition, commutating capacitor 19 will be charged to essentially the full potential of the direct current power supply connected across the power supply terminals 12 and 13. The polarity of the potential of the charge on capacitor 19 will be the same as the polarity of the power supply terminals 12 and 13, and the saturable windings 68 and 69 will be driven into positive saturation so that in order to maintain these windings in their saturated condition the potential across them must be positive at the dot end of the windings. Upon the load current carrying triac device 35 being gated on, the potential at the point 67 will go positive, however, with respect to the dot end of the winding portion 68 so that this portion of the winding is driven out of positive saturation towards negative saturation. Load current will be supplied through the positively saturated winding portion 69, however, and since the polarity of the potentials across this winding portion have not been reversed, this winding portion stays in its saturated condition. Load current flow through the winding portion 69, however, is transformed into the winding portion 68 to further charge the commutating capacitor 19 to a value dependent upon the value of the load current. Concurrently, with this action, the reversal of the potential across the winding portion 68 continues to drive the winding portion 68 all the way into the negative saturation. Upon this occurrence, the charge on the commutating capacitor 19 is oscillated through the closed series tuned loop comprised by the saturated reactor portion 68, commutating capacitor 19 and the conducting triac device 35 to reverse the polarity of the charge on the commutating capacitor 19. Upon this occurrence, the polarity of the potential across winding portion 68 will be again reversed, and it will be driven out of negative saturation back towards positive saturation. Accordingly, for the interval of time required to drive the core of the winding 68 into negative saturation and back into positive saturation, the load current carrying triac device 35 supplies load current to the load 11. Upon the winding portion 68 again reaching positive saturation, the reversed polarity charge 19 on the commutating capacitor will drive the potential of the point 67 sharply positive with respect to the potential of supply terminal 12, thereby reversing the polarity of the potential across the load current carrying triac device 35, and causing it to turn off in the manner previously described more fully with respect to the circuit arrangement of FIGURE 2.

In all other respects, the operation of the circuit arrangement of FIGURE 5 is the same as that of the FIGURE 2 arrangement, and hence will not be again described in detail. The particular commutation arrangement of the FIGURE 5 circuit, however, does provide a means for charging the commutating capacitor 19 to a value as determined by the value of the load current. By this measure proper operation of the circuit is assured in those applications where the nature of the load 11 is such that some precautions must be taken to insure that commutation of the load current carrying triac device 35 will take place at the desired times.

Figure 6:
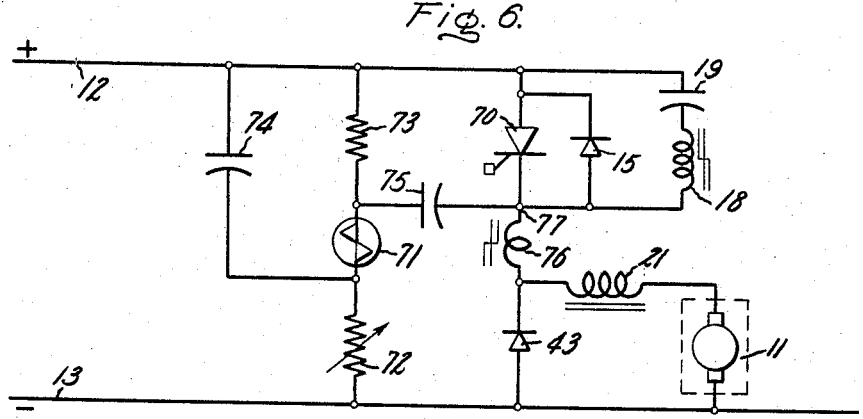
FIGURE 6 is a detailed circuit diagram of a time ratio control power circuit employing a dv/dt fired SCR together with a conventional coasting rectifier and simple series connected saturable reactor-commutating capacitor commutation scheme.

FIGURE 6 of the drawings illustrates still another form of new and improved time ratio control power circuit constructed in accordance with the invention. The circuit arrangement of FIGURE 6 employs a dv/dt fired silicon controlled rectifier device 70 which may comprise a conventional silicon controlled rectifier having its gate open circuited. The dv/dt fired silicon controlled rectifier device 70 is connected in series circuit arrangement with a load 11, a filter inductance 21, and a small saturable reactor 76 across the power supply terminals 12 and 13 which are in turn adapted to be connected to a source of electric potential. A conventional coasting rectifier 43 is connected in parallel circuit relationship with the load 11 and the filter inductance 21. Commutation circuit means comprised by a saturable reactor 18 and commutating capacitor 19 are connected in series circuit relationship across the dv/dt fired SCR 70. A feedback diode 15 also is connected in parallel circuit relationship across the dv/dt fired SCR 70 in a reverse polarity sense.

The dv/dt fired SCR 70 is turned on by a gating circuit means comprised by a pulse forming network. The pulse forming network includes a snap action switch device 71 which may comprise a shockly diode, one of the voltage sensitive bi-directional conducting diode devices manufactured by the Hunt Electric Company and known as a Hunt diode, a small, three layer NPN signal diac device manufactured and sold by the Rectifier Components Dept. of the General Electric Company, Auburn, N.Y., or a similar snap action switch device which breaks down and conducts practically instantaneously upon the potential across it reaching a predetermined value. The snap switch device 71 should require no special resetting means such as a commutation circuit to return it to its blocking condition, but should automatically reset to its nonconducting or blocking condition upon the potential across the device dropping below its predetermined firing level. The snap action switch device 71 is connected in series circuit relationship with a voltage dropping resistor 73 and a variable resistor 72 across the power supply terminals 12 and 13. The juncture of the snap action switch device 71 and variable resistor 72 is connected to one plate of a charging capacitor 74 with the remaining plate of the charging capacitor 74 being connected to the power supply terminal 12. The juncture of the snap action switch device 71 and the dropping resistor 73 similarly is connected to one plate of a second charging capacitor 75 whose remaining plate is connected to a junction point 77 to which the negative load terminal of the dv/dt fired SCR 70 is connected along with the positive terminal of feedback diode 15, as well as one terminal of the saturable reactor 18 and one terminal of the small saturable reactor 76.

It is a known characteristic of silicon controlled rectifier devices that if a very steep wavefront pulsed square wave potential is applied across the load terminals of the device, this large change of voltage across the device in a very short time (which is referred to as a high dv/dt voltage pulse) in effect causes an avalanche conduction condition through the SCR device thereby turning it full on almost instantaneously with the application of the firing pulse. In the circuit arrangement of FIGURE 6 it is a function of the firing network means to produce a sharp high dv/dt voltage pulse across the dv/dt fired SCR 70. This sharp voltage pulse is produced when the voltage across the charging capacitor 74, which builds up at a rate determined by the setting of the variable resistor 72, is of a sufficient value to cause the snap action switch device 71 to break down and conduct. Conduction through the snap switch device 71 essentially connects the two charging capacitors 74 and 75 in series circuit relationship across the dv/dt fired SCR 70. This action results in driving the potential of the point 77 sharply negative with respect to the power supply terminal 12, and produces a very sharp wavefront (high dv/dt) change in potential across the dv/dt fired SCR 70. As a consequence, the dv/dt fired SCR 70 is rendered fully conducting almost instantaneously with the turn on of snap switch device 71. The firing voltage pulse is maintained across the dv/dt fired SCR device 70 for the period of time required for the small saturable reactor 76 to saturate. Upon saturable reactor 76 being saturated, the voltage pulse is instantaneously removed since the impedance of this saturable reactor will drop almost to zero upon saturation thereby removing the pulse, and further serves to shape the square wave firing pulse. This action served to discharge the capacitor 74 sufficiently to allow the snap action switch device 71 to return to its nonconducting or blocking condition, and capacitor 74 will commence to recharge through the variable resistor 72 at a rate dependent upon the setting of the variable resistor 72.

Prior to the dv/dt fired SCR device 70 being turned on in the above-mentioned manner, the commutating capacitor 19 will have been fully charged to substantially the full potential of the direct current power supply connected across the power supply terminals 12 and 13 through the saturable reactor 18. Thereafter, upon the dv/dt fired SCR device 70 being turned on in the above described manner, the commutation circuit means comprised by saturable reactor 18 and commutating capacitor 19 will function to turn off the device in precisely the same manner as the commutation circuit means 18 and 19 described with relation to the circuit arrangement of FIGURE 1. Hence, a further description of the commutation operation of the circuit of FIGURE 6 is believed unnecessary. It should be noted, however, that at instant of commutation, upon the potential of the point 77 being driven positive with respect to the power supply terminal 12, and particularly if the load 11 is inductive in nature, the feedback diode 15 will be rendered conductive and will feed back current to the power supply in the previously described manner until such time that the potential at the point 77 again drops below the value of the potential of power supply terminal 12. Thereafter, the coasting rectifier 43 will function in the manner described with respect to the circuit of FIGURE 2 to smooth the value of the direct current being supplied in load 11 in the conventional manner of a coasting rectifier. It should be noted, however, that because of the avalanche conduction which initially takes place upon the firing of the dv/dt fired SCR 70, the frequency response of the circuit arrangement of FIGURE 6 can be much higher than that of circuit arrangements employing a gate controlled turn on of the SCR. Hence, for high frequency applications, the circuit arrangement of FIGURE 6 may be preferred since it employs only a relatively simple gating circuit means together with a simple series connected saturable reactor and commutating capacitor commutation scheme.

Figure 7:
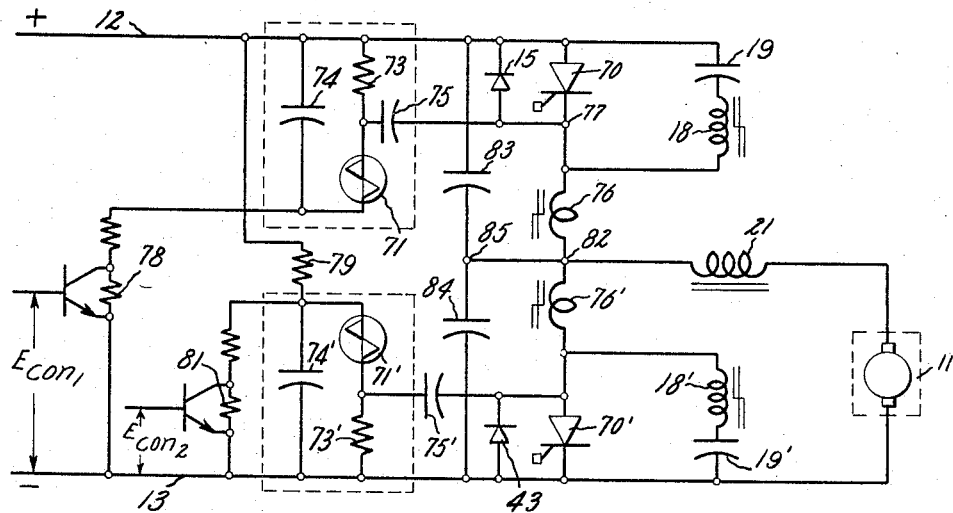
FIGURE 7 is a detailed circuit diagram of an all dv/dt fired SCR time ratio control power circuit employing a simple series connected saturable reactor-commutating capacitor commutation scheme.

FIGURE 7 of the drawings illustrates a new and improved time ratio control power circuit employing two dv/dt fired silicon controlled rectifier devices 70 and 70' for both load current carrying and coasting and pumpback purposes. In the circuit arrangement of FIGURE 7, a load 11 is connected in series circuit relationship with a filter inductance 21, a small saturable reactor 76, and a load current carrying dv/dt fired SCR 70 across the power supply terminals 12 and 13. A feedback diode 15 is connected in parallel circuit relationship with the load current carrying dv/dt fired silicon controlled rectifier device 70 in a reverse polarity sense. A pumpback dv/dt fired SCR device 70' and coasting rectifier 43 are connected in parallel circuit relationship in a reverse polarity senes. This parallel combination is then connected in series circuit relationship with a second small saturable reactor 76', and the series circuit thus comprised is connected in parallel with the load 11 and filter inducance 21. Commutation circuit means comprised by a series connected saturable reactor 18 and commutating capacitor 19 are connected across the load current carrying dv/dt fired SCR 70 for commutating off the dv/dt fired SCR 70 in the load current carrying direction. Gating circuit means comprising a first pulsing network are connected across the load current carrying dv/dt fired SCR 70 for turning on the dv/dt fired SCR device 70 in the load current carrying direction. This pulsing network means is comprised by snap action switch device 71, the two charging capacitors 74 and 75 and the resistor network 73 and 78 and is essentially identical in construction and operation to the pulsing network described in connection with the circuit shown in FIGURE 6. There is a difference, however, in that an electronically variable resistor 78 is substituted in place of the mechanically variable resistor 72 of the circuit arrangement of FIGURE 6. The electronically variable resistor 78 comprises a fixed resistor connected in parallel with an NPN junction transistor whose conductance is varied to vary the overall resistance of the parallel transistor-resistor network arrangement. In this manner, the rate at which the charging capacitor 74 is charged to a value sufficient to fire the snap action switch means 71 is controlled by controlling the value of the control signal $E_1$ supplied to the base electrode of the NPN junction transistor. The pumpback dv/dt fired SCR device 70' is turned on by a second gating circuit means comprised by a second pulsing network 71' through 75' acting in conjunction with the resistor 79 and the variable resistor 81 in a manner similar to the first pulsing network. Commutation off of the coasting and pumpback dv/dt fired SCR device 70' is achieved by the second commutation circuit means comprised by second saturable reactor 18' and second commutating capacitor 19' connected in series circuit relationship across the dv/dt fired SCR device 70'.

In operation, the circuit of FIGURE 7 operates in an identical fashion to the circuit of FIGURE 6 in the load current carrying direction. That is to say upon the dv/dt fired load current carrying SCR device 70 being turned on load current is supplied to the load 11 until it is commutated off by its associated first commutation circuit means 18 and 19. At the instant of commutation, the feedback rectifier 15 may be rendered conductive for a period of time that the juncture point 77 is at a potential higher than the potential of the supply terminal 12 and then turns off. Upon turn off of the feedback diode 15, the coasting rectifier 43 operates to supply load current to load 11 due to the discharge of the filter inductance 21.

In the second mode of operation where the load 11 is operating as a generator, the pumpback dv/dt fired SCR device 70' is turned on and off by its associated gating circuit means and commutation circuit means to cause the potential of the point 82 to periodically rise above the potential of the supply terminal 12. This causes the feedback diode 15 to be rendered conductive and feed current back into the power supply in the manner previously described with other circuit arrangements. If desired, a pair of isolating capacitor 83 and 84 may be connected in series circuit relationship across the power supply terminals 12 and 13 with the juncture 85 of the two capacitors being connected to the junction point 82. By this arrangement, the sharp voltage changes occasioned by the turn on and turn off of the dv/dt fired SCR devices 70 and 70' may be isolated from each other. The advantages of the circuit arrangement of FIGURE 7 are in the fact that the dv/dt fired SCR devices 70 and 70' can respond much to faster firing signals, and hence the circuit is capable of operating at higher frequencies than corresponding circuits employing gate fired controlled conducting devices.

Figure 8:
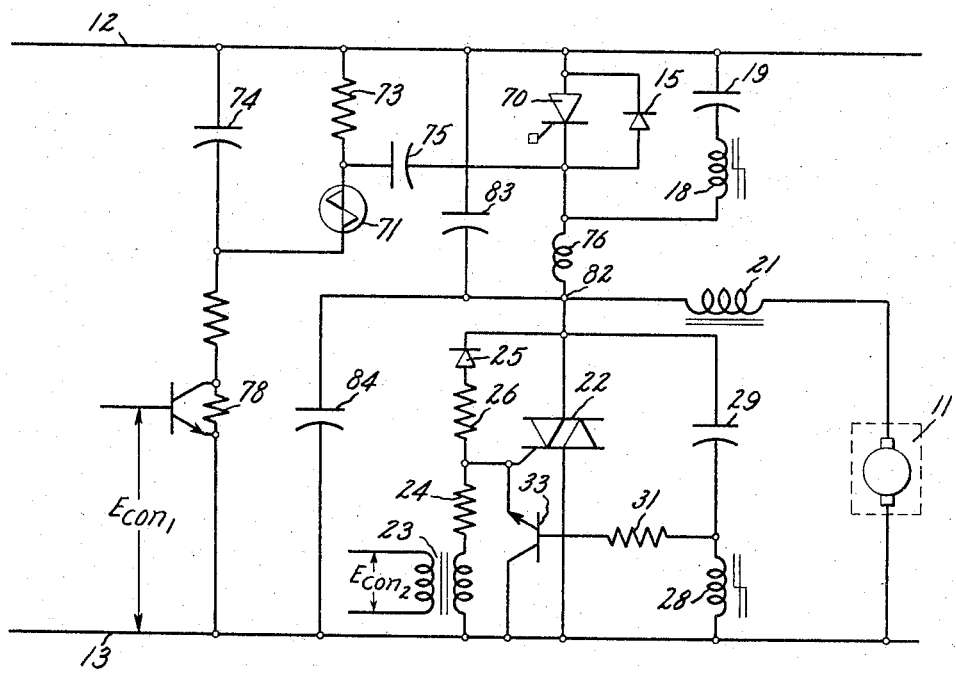
FIGURE 8 is a detailed circuit diagram of a time ratio control power circuit employing a dv/dt fired SCR and triac in conjunction with the simple series connected saturable reactor-commutating capacitor commutation scheme.

The circuit arrangement shown in FIGURE 8 of the drawings comprises a time ratio control power circuit employing a dv/dt fired silicon controlled rectifier device 70 for load current carrying purposes, and a triac bidirectional conducting device 22 for coasting and pumpback purposes. The load current carrying dv/dt fired SCR 70 has commutation circuit means 18 and 19 and firing circuit means 71 through 75 and 78 which are identical in construction and operation to the gating circuit means and commutation circuit means of the circuit arrangements illustrated and described with relation to FIGURES 6 and 7 of the drawings. Similarly, the gating circuit means and the commutation circuit means associated with the coasting and pumpback triac bi-directional conducting device 22 are identical in construction and operation to the corresponding means described in connection with the arrangement of FIGURE 1 of the drawings. Accordingly, it is not believed necessary to describe further the operation and construction of the circuit arrangement in FIGURE 5.

Figure 9:
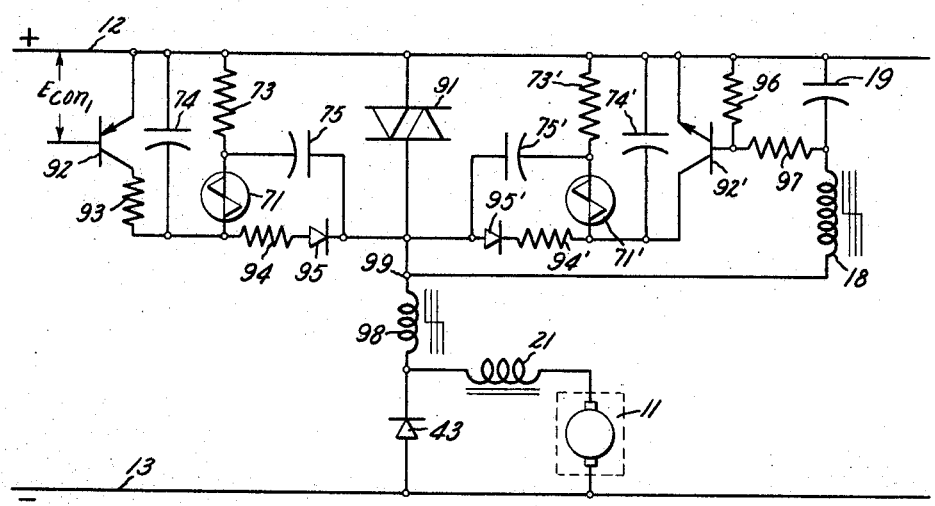
FIGURE 9 is a detailed circuit diagram of a new and improved time ratio control power circuit employing a bi-directional conducting diac device in conjunction with a conventional coasting diode and a simple series connected saturable reactor-commutating capacitor commutation scheme.

In the circuit arrangement shown in FIGURE 9 of the drawings, a new and improved time ratio control power circuit is illustrated which employs a power diac bidirectional conducting device 91 for load current carrying and feedback purposes. The bi-directional conducting power diac device 91 is essentially an NPNPN, five-layer junction device capable of conducting large currents of the order of 1500 amperes or more in either one of two directions through the device, depending upon the polarity of the potential applied across the device. The power diac 91 is triggered from its blocking or low conductance condition to its on or high conductance condition by the application of a high dv/dt firing pulse across its load terminals similar to the dv/dt fired silicon controlled rectifier circuit arrangements of FIGURES 6–8. It should be noted that the power diac 91 illustrated in FIGURE 9 is an entirely different device than its cousin the signal diac which is a low current, three-layer junction device designed to operate primarily in the milliwatt region, and used primarily in sensing and gating circuit applications. For a more detailed description of the power diac device 91, reference is made to an article entitled, "Two-Terminal Asymmetrical and Symmetrical Silicon Negative Resistance Switches," by R. W. Aldrich and N. Holonyak, Jr., appearing in the Journal of Applied Physics, vol. 30, No.

11, November 1959, pages 1819–1824. The power diac device 91 is connected in series circuit relationship with a load 11, a filter inductance 21 and a small saturable reactor 98 across the power supply terminals 12 and 13 which in turn are adapted to be connected to a source of electric potential. The power diac device 91 is turned on in its load current conducting direction by first gating circuit means. The first gating circuit means includes first pulse forming network means comprised by snap action device 71 and two charging capacitors 74 and 75 which are connected similar to the pulsing network used to turn on the dv/dt fired SCR 70 illustrated in the circuits of FIGURES 6–8. There is a distinction, however, in that the charging capacitor 74 is connected in parallel with a controlling circuit comprised by an NPN junction transistor 92 connected in series circuit relationship with a limiting resistor 93. A variable control signal $E_1$ supplied to the base electrode of the NPN junction transistor 92 will vary the conductance of this circuit, and hence vary the charging rate of the charging capacitor 74 to determine at what point this capacitor will cause the snap action conducting device 71 to be turned on. Upon the snap action conducting device 71 being turned on, the two charging capacitors 74 and 75 will be effectively connected in series to the junction point 99 so as to drive the potential of this point sharply negative with respect to the potential of supply terminal 12. This results in producing a sharp wavefront high dv/dt voltage pulse across the diac device 91 which causes it to be rendered fully conductive in the load current carrying direction.

The power diac device 91 is commutated off by commutating circuit means comprised by a series connected saturable reactor 18 and commutating capacitor 19 connected in series circuit relationship across the power diac device. Of course, the saturated impedance of the saturable reactor 18 is tuned to series resonance with commutating capacitor 19 at the desired commutating frequency, as is true of all the commutation circuit means of the circuits described in the present application. The simple series connected saturable reactor-commutating capacitor commutation circuit means operates in an identical manner to the similar commutation circuit means described with relation to the embodiments of the invention shown in FIGURES 1–8 and hence will not be again described in detail.

Since the power diac device 91 is a bi-directional conducting device, it is necessary to provide second gating circuit means comprised by a second pulse forming network formed by the snap action switching device 71′, the two charging capacitors 74′ and 75′ and the resistor networks 73′ and 94′ and blocking diode 95′. In addition, a variable conductance NPN junction transistor 92′ is connected in parallel circuit relationship with the charging capacitor 74′ to control the rate of charge of this capacitor. For this purpose the base electrode of transistor 92′ is connected to the juncture of a pair of voltage dividing resistors 96 and 97 connected between the power supply terminal 12 and the juncture of the commutating capacitor 19 with the saturable reactor 18. In order to assure that the first and second gating circuit means will actuate the power diac device 91 to turn it on, a small saturable reactor 98 is included in the series circuit relationship with the power diac 91 at a point intermediate the power diac 91 and filter inductance 21. By this arrangement, the potential of the point 99 will be held off for a period of time required to saturate this small saturable reactor 98 thereby assuring that it is driven sharply in a negative direction upon the turn on of the snap action switch devices 71 or 71′, and produces a firing pulse having a high dv/dt. It should be noted that the blocking diode 95 will hold off the potential of the junction point 99 when the potential of that point goes positive with respect to the power supply terminal 12, and similarly, the blocking diode 95′ will hold off the potential of junction point 99 when the potential of that point goes negative with respect to the power supply terminal 12. In this manner, it is assured that the two gating circuit means operate separately only at desired times as determined by the polarity of the potential of the junction point 99 when compared to the potential of the power supply terminal 12.

The time ratio control power circuit of FIGURE 9 operates in the following manner. Considering the circuit to be in its nonconducting quiescent condition, then the charging capacitor 74 will be charged through the load 11, filter inductance 21, saturable reactor 98, blocking diode 95 and resistor 94 at a rate determined by the value of the control signal supplied to the base of the NPN junction transistor 92. Upon the charging capacitor 74 reaching a sufficient value, it will cause the snap action switching device 71 to be rendered conductive, thereby connecting the two charging capacitors 74 and 75 in series circuit relationship to the junction point 99. This results in driving the potential of the point 99 sharply negative for the period of time required to saturate the small saturable reactor 98, and in this interval of time, the power diac device 91 will be turned on and rendered fully conductive in the load current carrying direction. Thereafter, the commutation circuit means comprised by saturable reactor 18 and commutating capacitor 19 will operate in the manner previously described with relation to the circuit of FIGURE 1 to commutate off of the power diac device 91.

At the point in the commutation cycle where the potential of the juncture point 99 is driven sharply positive with respect to the potential of the power supply terminal 12, the diode 95′ is rendered conductive so as to apply a turning on pulse to the snap action switch 71′ and causing this to be turned on. Turn on of the snap acting switch 71′ causes the two charging capacitors 74′ and 75′ of the second pulse forming network means to be coupled to the juncture point 99 to again sharply drive the potential of this point positive with a sharp voltage spike having a high dv/dt for a short interval of time. Upon this occurrence, due to the reversal of the polarity of the potential across diac 91, since at this point in time the potential of junction point 99 is positive with respect to the power supply terminal 12, the power diac device 91 which is bi-directional conducting in its characteristic is turned on to conduct current in the reverse feedback direction. Conduction in the reverse feedback direction will continue until such time that the potential of the point 99 drops below the potential of the power supply terminal 12 in which event the power diac turns off and returns to its fully blocking condition.

Upon power diac 91 returning to its fully blocking condition, rectifier 43 will operate in the conventional manner of a coasting rectifier to circulate the current in the filter inductance 21 through load 11 as described previously in connection with FIGURE 2. It should be noted that the power diac device 91 is an avalanche operated device so that its frequency of response is much greater than that of the gate controlled devices. For this reason, the circuit of FIGURE 9 is intended for applications where high frequency operation is desired. Further, since only a single power diac device 91 may be employed in place of the dv/dt fired silicon controlled rectifier and its companion feedback diode, simplification of the circuit arrangement is achieved.

Figure 10:
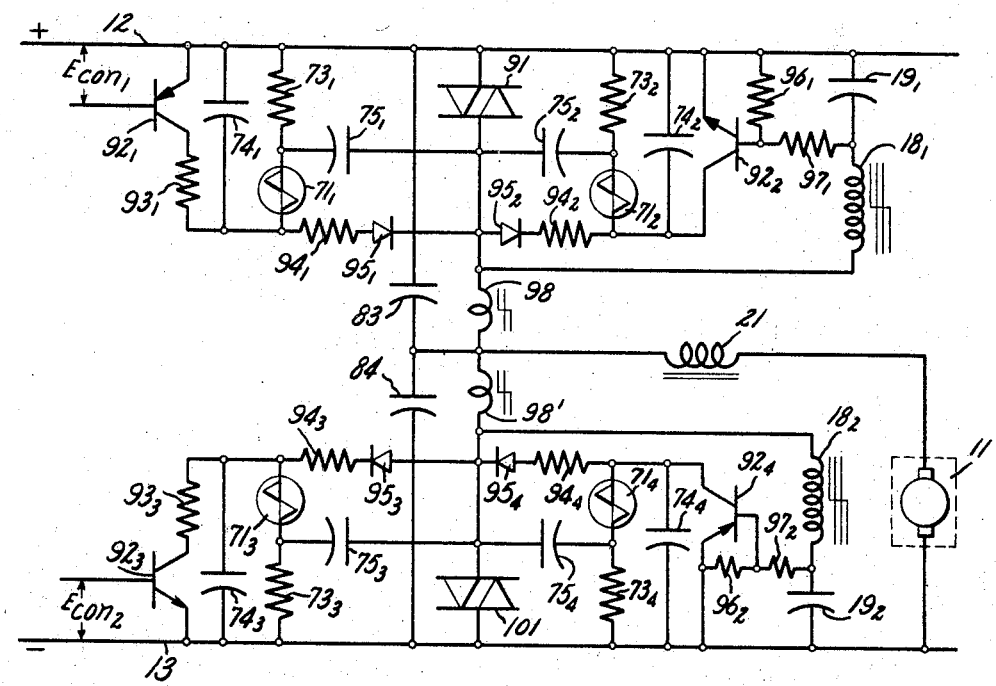
FIGURE 10 is a detailed circuit diagram of an all diac version of a time ratio control power circuit employing the simple series connected saturable reactor-commutating capacitor commutation scheme.

FIGURE 10 of the drawings illustrates an embodiment of the invention which employs two power diac bi-directional conducting devices 91 and 101. The power diac 91 is connected in series circuit relationship with the load 11, filter inductance 21 and small saturable reactor 98 across the pair of power supply terminals 12 and 13 and serves as a load current carrying and feedback device. The power diac 101 is connected in series circuit relationship with a small saturable reactor 98′ and the series circuit thus comprised is connected in parallel circuit relationship with the load 11 and the filter inductance 21.

By this arrangement, the power diac 91 will serve as a load current carrying controlled conducting device when turned on by its gating circuit means comprised by a first pulse forming network means which includes elements $71_1$-$75_1$ and $92_1$-$95_1$. The load current carrying diac 91 is commutated off by first commutation circuit means comprised by the saturable reactor $18_1$, and series connected first commutating capacitor $19_1$. Concurrently with the end of the commutation interval, a second pulse forming network means comprised by the elements $71_2$-$75_2$, $92_2$, $94_2$, $95_2$ and $96_1$ and $97_1$ co-act to turn on the load current carrying power diac 91 in the reverse current feedback direction. A fourth pulse forming network means comprised by the elements $71_4$-$75_4$, $92_4$, $94_4$, $95_4$, $96_2$ and $97_2$ co-act to turn on the power diac 101 in the coasting rectifier current direction upon the power diac 91 being turned fully off following a load current carrying conduction interval. While the coasting and pumpback power diac 101 is being operated in a pumpback current direction, that is when the load 11 is acting as a generator, the second commutation circuit means comprised by the second saturable reactor $18_2$ and series connected second commutating capacitor $19_2$ operate to turn off the coasting and pumpback diac 101. During the interval of commutation, the potential across the commutating capacitor $19_2$ is fed back through the resistor divider network $96_2$, $97_2$ to control the conductance of the NPN junction transistor $92_4$ and thereby render the fourth pulse forming network means ineffective during the commutation intervals. Similarly, during the load current commutation by the first commutation circuit means $18_1$ and $19_1$, the resistor divider network $96_1$ and $97_1$ feed back a potential to the base of the NPN junction transistor $92_2$ to control conductance of this transistor, and thereby render the second pulse forming network means ineffective during the commutation intervals of the first commutation circuit means. Since the load current carrying power diac device 91 as well as the coasting and pumpback power diac device 101 both operate in identical manner to the power diac device described in detail with relation to the circuit of FIGURE 9 of the drawings a further detailed description of the construction and operation of these circuits is believed unnecessary. It should be noted, however, that it is desirable to isolate the two power diac circuits from each other and for this purpose, two isolating capacitors 83 and 84 are connected in series circuit relationship across the power supply terminals 12 and 13 with their junction being connected to the junction of the two small saturable reactors 98 and 98'. In addition, it should be noted that the circuit of FIGURE 10 incorporates all of the advantages of high frequency operation possible with the circuit of FIGURE 9, and further is capable of operating in the second mode of operation to pump power back into a power supply under those conditions of operation of the load 11 where the load 11 functions as a generator.

Figure 11:
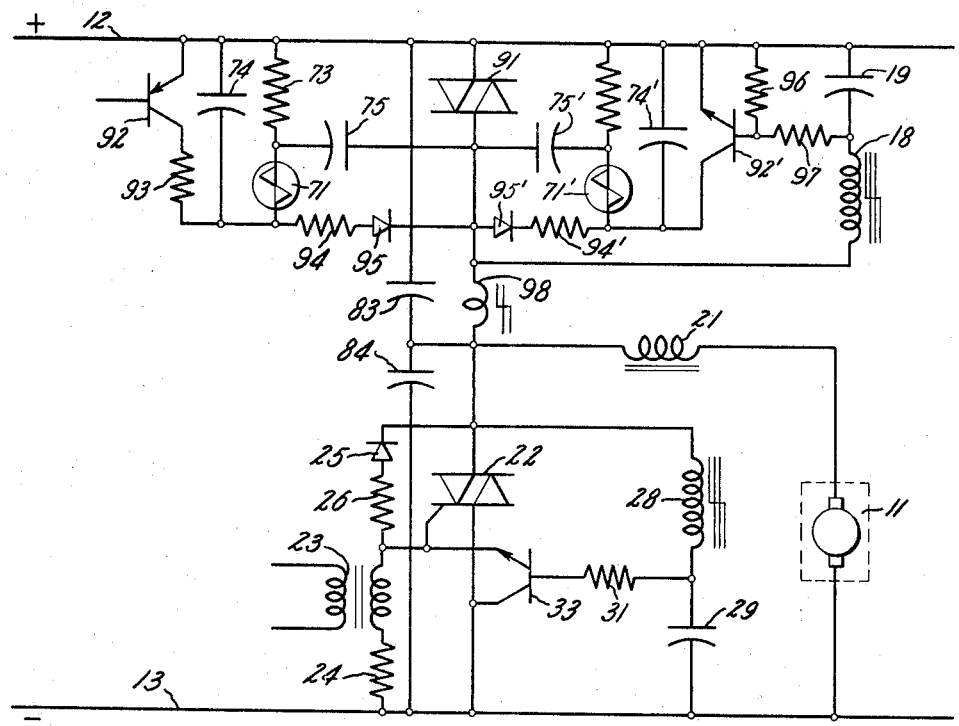
FIGURE 11 is a detailed circuit diagram of a time ratio control power circuit employing a diac and triac in conjunction with the simple series connected saturable reactor-commutating capacitor commutation scheme.

FIGURE 11 of the drawings illustrates an embodiment of the invention wherein a time ratio control power circuit is provided which utilizes a power diac bi-directional conducting device 91 for load current and feedback conducting purposes, and a triac bi-directional conducting device 22 for coasting and pumpback purposes. The load current carrying power diac 91 is connected in series circuit relationship with a load 11, a filter inductance 21 and small saturable reactor 98 across a pair of power supply terminals 12 and 13. The coasting and pumpback triac device 22 is connected in parallel circuit relationship with the load 11 and filter inductance 21. The gating circuit means and commutation circuit means employed in conjunction with the load current carrying power diac device 91 are identical in construction and operation to the circuit arrangement described in FIGURE 9 of the drawings, and hence will not be again described in detail. Similarly, the gating circuit means and commutation circuit means employed in conjunction with the coasting and pumpback triac device 22 are identical in construction and operation to the circuit arrangement described with relation to FIGURE 1 of the drawings. For this reason, it is believed unnecessary to provide a detailed description of the construction and operation of the overall circuit arrangement of FIGURE 11. While the circuit arrangement of FIGURE 11 is not capable of as high a frequency of operation as is the time ratio control power circuit of FIGURE 10, for example, it does achieve some simplicity by the substitution of the coasting and pumpback triac device 22 for the power diac device employed in the FIGURE 10 circuit arrangement.

Figure 12:
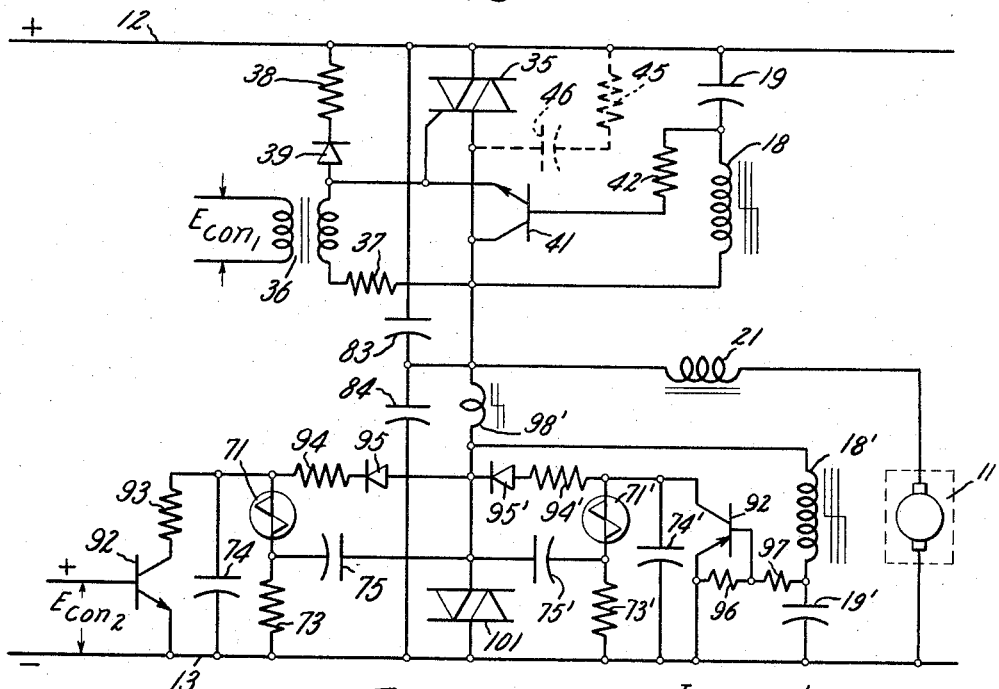
FIGURE 12 is a detailed circuit diagram of a time ratio control power circuit employing a triac for load conducting and feedback purposes and a diac for coasting and pumpback purposes, and utilizing the simple series connected saturable reactor-commutating capacitor commutation scheme.

FIGURE 12 of the drawings illustrates an embodiment of the invention wherein a load curent carrying triac bi-directional conducting device 35 is employed to supply load current to a load 11 in conjunction with a coasting and pumpback diac device 101. The load current carrying triac device 35 employs gating circuit means and commutation circuit means which are identical in construction and operation to the circuit arrangement of FIGURE 2, and the coasting and pumpback power diac device 101 is identical in construction and operation to the circuit arrangement of FIGURE 10. For this reason, a further detailed description of the construction and operation of the embodiment of the invention shown in FIGURE 12 is believed unnecessary. It should be noted, however, that in addition to the isolating capacitors 83 and 84 it may be desirable to include a series connected resistor 45 and capacitor 46 connected across the load current carrying triac device 35 for further limiting the rate of rise of reapplied voltage across this device when the coasting and pumpback power diac 101 is turned on and off. Since such an arrangement may be alternatively employed, it is illustrated in dotted outline form. The circuit arrangement of FIGURE 12, similar to the circuit of FIGURE 11 is somewhat simpler than that of FIGURE 10 although it is not capable of as high a frequency of operation as is that of the circuit of FIGURE 10.

Figure 13:
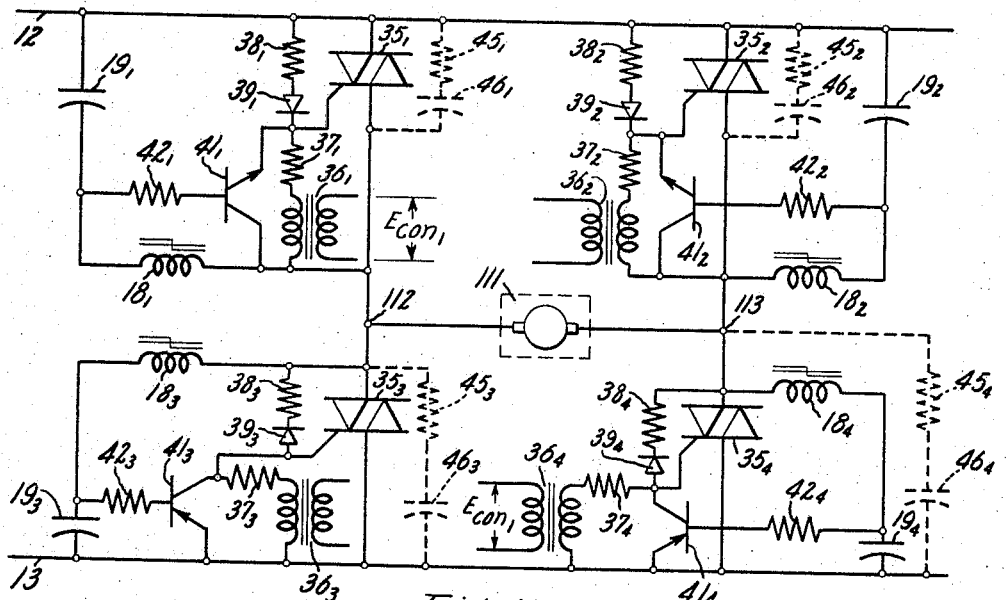
FIGURE 13 is a detailed circuit diagram of an all triac version of a power inverter constructed in accordance with the present invention.

FIGURE 13 of the drawings illustrates a new and improved power inverter circuit constructed in accordance with the invention. The power inverter circuit shown in FIGURE 13 employs four load current carrying triac bi-directional conducting devices $35_1$, $35_2$, $35_3$ and $35_4$, which are used to connect alternate terminals of a load 111 across the power supply terminals 12 and 13. For this purpose, the gating signal sources coupled to the control gates of the power triac devices $35_1$-$35_4$ are adjusted so that two of the triac devices $35_1$ and $35_4$ are gated on concurrently so that in effect the terminal 112 of load 111 is connected to supply terminal 12 and the terminal 113 of load 111 is connected to the supply terminal 13. Subsequently, the power triacs $35_1$ and $35_4$ are commutated off so that they return to their nonconducting blocking condition, and the power triacs $35_2$ and $35_3$ are gated on. With the circuit conducting in this fashion, the terminal 113 of load 111 then is connected to the power supply terminal 12, and the terminal 112 of load 111 is connected to the power supply terminal 13 thus reversing the polarity of the potential supplied across the load 111. Subsequently, the load current carrying triac devices $35_2$ and $35_3$ are commutated off and the circuit its thereby returned to its initial quiescent condition ready for another cycle of operation. From this description, it can be appreciated that the timing or sequence of the firing of the load current carrying power triac devices $35_1$-$35_4$ serves to connect the load 111 across the power supply terminals 12 and 13 in an alternate manner to in effect develop an alternating current flow through the load 111 during successive periods of operation. The gating and commutation circuit means associated with each of the load current carrying power triac devices $35_1$ and $35_2$ are identical in construction and operation to the gating circuit and commutation circuit means described in connection with the circuit arrangement of FIGURE 2, and hence need not be again described in detail. The gating and commutation circuit means associated with each of the load current carrying triac devices $35_3$ and $35_4$ are mirror versions of the gating and commutation circuit means associated with the power triacs $35_1$ and $35_2$; however, they operate in precisely the same manner. For this reason, all the elements of the circuit of FIGURE 13 have been given the same reference numerals which their corresponding elements were given in the circuit arrangement shown in FIGURE 2 of the drawings with the subscripts 1, 2, 3, or 4 added to indicate that they are associated with respective ones of the load current carrying triacs $35_1$, $35_2$, $35_3$, or $35_4$. If desired, voltage limiting circuits comprised by the resistors 45 and capacitors 46 may be connected in series circuit relationship across each of the load current carrying power triac devices $35_1$–$35_4$ as indicated by the dotted line connections in order to limit the rate of rise of reapplied voltage across these devices to thereby avoid possible misfiring of the devices due to undesired dv/dt potentials appearing across the devices, and their susceptibility to firing by this method.

Figure 14:
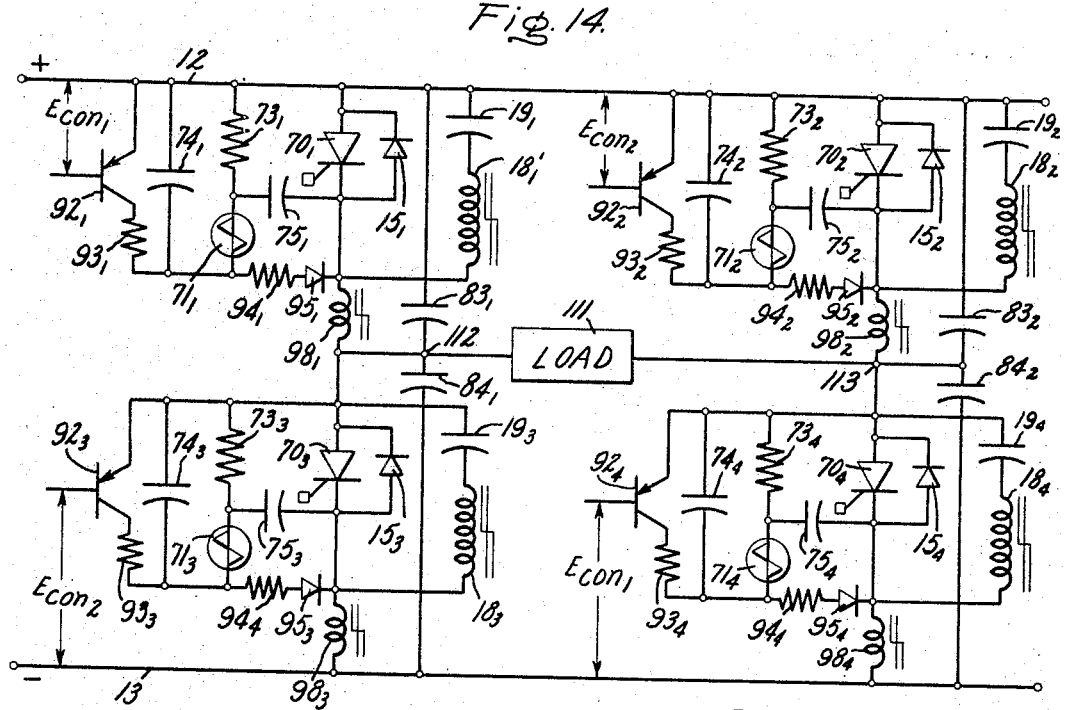
FIGURE 14 is a detailed circuit diagram of an all dv/dt fired SCR power inverter constructed in accordance with the present invention.

FIGURE 14 of the drawings shows still a different form of improved power inverter circuit using dv/dt fired silicon controlled rectifiers having reversely connected feedback diodes coupled in parallel therewith. The power inverter circuit of FIGURE 14 performs the same function as the inverter circuit of FIGURE 13 but differs therefrom in that it employs dv/dt fired silicon controlled rectifier devices $70_1$–$70_4$ for load current carrying purposes, and reversely connected feedback diodes $15_1$–$15_4$ for feedback purposes in those instances where the load 111 interconnected between the junctures of the load current carrying dv/dt fired SCR's $70_1$–$70_4$ might require a feedback path to the power supply. The load 111 of the circuit arrangement shown in FIGURE 14 has its terminal 112 alternately connected to the power supply terminals 12 and 13 through the dv/dt fired SCR devices $70_1$ and $70_3$ respectively. Similarly, the terminal 113 of load 111 is alternately connected to the power supply terminals 12 and 13 through the alternately conducting load current carrying dv/dt fired SCR's $70_2$ and $70_4$, respectively. In this manner, the terminals of the load 111 are alternately connected between the power supply terminals 12 and 13 to develop across the load 111 an alternating current potential. The gating and commutation circuit means associated with each of the load current carrying dv/dt fired SCR devices $70_1$–$70_4$ are identical in construction and operation to the gating circuit means and commutation circuit means described in connection with the circuits shown in FIGURES 6–8, and operate in precisely the same manner, and hence need not be again described in detail. In order to clearly indicate which of the gating circuit means and the commutating circuit means operates with respective ones of the load current carrying dv/dt fired SCR devices $70_1$–$70_4$, the elements of each of the circuit means have been given the same reference numerals as the corresponding elements of the circuit arrangement shown in FIGURES 6–8, with the corresponding elements of the FIGURE 14 circuit arrangement being given the subscripts 1, 2, 3 or 4 to show that they are associated with respective ones of the load current carrying dv/dt fired SCR devices $70_1$, $70_2$, $70_3$, or $70_4$. In operation, the gating circuits of the dv/dt fired SCR devices $70_1$ and $70_4$ are phased so that these devices turn on simultaneously and conduct over the same time period. Thus, dv/dt fired SCR devices $70_1$ and $70_4$ serve to operatively connect the terminal 112 to supply terminal 12 and the terminal 113 of load 111 to the supply terminal 13, respectively. Subsequently, the dv/dt fired SCR devices $70_1$ and $70_4$ are commutated off by their respective associated commutation circuit means, and the two dv/dt fired SCR devices $70_2$ and $70_3$ are turned on simultaneously and conduct for the same time period. Upon this occurrence, the terminal 113 of load 111 will be operatively connected to the power supply terminal 12, and the terminal 112 of load 111 will be operatively connected to power supply terminal 13, respectively, thereby reversing the polarity of the potential applied across the load 111. Subsequently, the two load current carrying dv/dt fired SCR devices $70_2$ and $70_3$ are commutated off by their respective associated commutation circuit means thereby returning the inverter circuit to its initial condition of operation ready for a new cycle to commence. Repeated operation of the circuit in this manner then functions to develop an alternating current potential across the load 111 having a frequency determined by the frequency of the gating signal pulses supplied to the respective dv/dt fired load current carrying SCR devices $70_1$–$70_4$. Because of the sharp voltage changes occurring in the inverter circuit arrangement of FIGURE 14, it is desirable that the isolating capacitors $83_1$ and $84_1$ having their junction connected to the terminal 112 of load 111 to be provided along with the isolating capacitors $83_2$ and $84_2$ whose junction is connected to the terminal 113 of load 111. By this arrangement, the rate of rise of reapplied voltage across respective ones of the load current carrying dv/dt fired SCR devices can be prevented from causing misfiring of one of the devices, and therefore malfunction of the inverter circuit arrangement.

Figure 15:
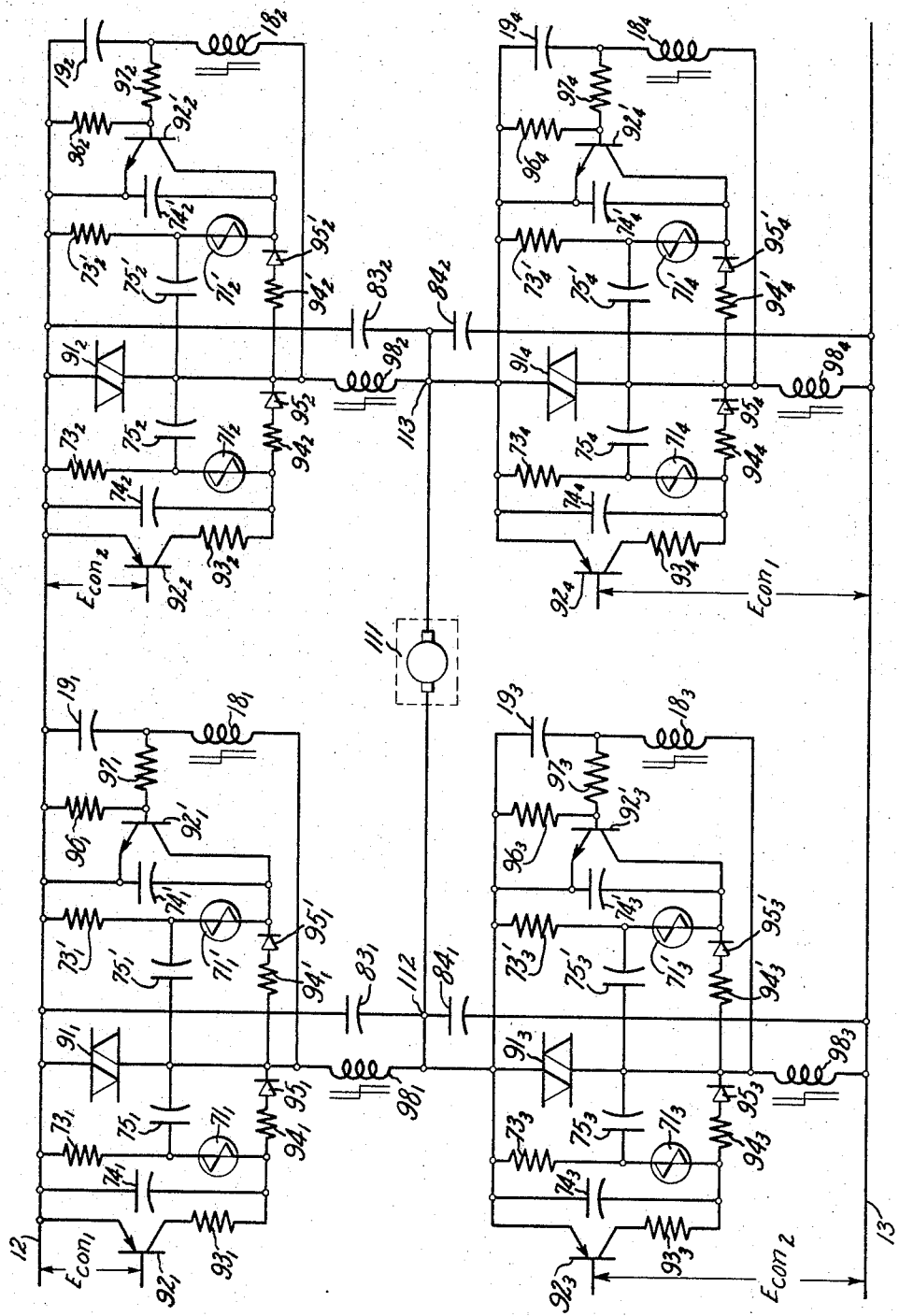
FIGURE 15 is a detailed circuit diagram of an all diac version of a power inverter constructed in accordance with the present invention.

FIGURE 15 of the drawings shows still another inverter power circuit constructed in accordance with the present invention which uses non-gate turn on, non-gate turn off solid state power diac semiconductor devices. In the circuit of FIGURE 15, a load 111 has terminals 112 and 113 connected alternately across the power supply terminals 12 and 13 by a set of load current carrying power diac devices $91_1$–$91_4$. Each of the load current carrying power diac devices $91_1$–$91_4$ has respective associated gating and commutation circuit means operatively coupled thereto which are identical in construction and operation to the gating and commutation circuit means described with relation to the power diac circuit shown in FIGURE 9 of the drawings. Because each of the elements of the gating and commutation circuit means associated with the load current carrying power diac $91_1$–$91_4$ are the same, and perform precisely the same functions as their correspondingly numbered elements of the FIGURE 9 circuit, these elements in the circuit shown in FIGURE 15 have been given the same reference numeral with the subscripts 1–4 to indicate which one of the load current carrying power diac devices $91_1$–$91_4$, the elements are associated with. Since they function in precisely the same manner as the correspondingly numbered elements described with respect to the circuit of FIGURE 9, a further description of the construction and operation of these elements in the circuit environment of FIGURE 15 is believed unnecessary. It should be noted, that because of the abrupt voltage changes occasioned by turning on the load current carrying power diac devices $91_1$–$91_4$, some means for isolating the individual gating and commutation circuits associated with respective devices should be provided. For this purpose isolating capacitors $83_1$, $84_1$, $83_2$ and $84_2$ are interconnected across the power supply to the load terminals 112 and 113 so that a triggering on or commutation off of one of the load current carrying power diac devices $91_1$–$91_4$ is prevented from interfering with the operation of the neighboring load current carrying power diac device connected in series with it across the power supply terminals 12 and 13.

In operation, the power inverter circuit of FIGURE 15 operates in much the same fashion as the inverter circuits described with relation to FIGURES 13 and 14 in that the load current carrying power diacs $91_1$–$91_4$ operate to connect the terminals 112 and 113 of load 111 alternately across the power supply terminals 12 and 13 to thereby alternately reverse load current flow through the load 111. This is achieved by firing the load current carrying power diacs 91₁ and 91₄ simultaneously, then commutating these power diacs off and firing simultaneously the two load current carrying power diacs 91₂ and 91₃, and subsequently commutating these power diacs off to thereby complete a cycle of operation. Repeated operation in this manner then serves to develop an alternating current potential across the load 111. By reason of the use of the diac bi-directional conducting devices for load current carrying purposes, the frequency of operation of the inverter circuit shown in FIGURE 15 can be much higher than with the inverter circuits shown in FIGURE 13 in particular, and possibly with respect to FIGURE 14.

From the foregoing description, it can be appreciated that the present invention provides an entire family of new and improved time ratio control power circuits and power inverter circuits employing turn on, non-gate turn off controlled conducting devices. This family of power circuits are both economical and efficient in operation and relatively inexpensive to manufacture in that they employ a commutation scheme which is both simple and inexpensive. This simple and inexpensive commutation scheme nevertheless provides reliable commutation over a wide range of operating conditions from a no load to a full load condition, and it can even provide commutation which is dependent upon the value of the load current being supplied.

Having described several embodiments of new and improved time ratio control power circuits and power inverter circuits constructed in accordance with the present invention, it is believed obvious that other modifications and variations of the invention are possible in light of the above teachings. It is therefore to be understood that changes may be made in the particular embodiments of the invention described which are within the full intended scope of the invention, as defined by the appended claims.

What I claim as new and desire to secure by Letters Patent of the United States is:

1. An improved power circuit using turn on, non-gate turn off solid state conducting devices including in combination a turn on, non-gate turn off controlled bidirectional semiconductor conducting device operatively connected across a pair of power supply terminals that in turn are adapted to be connected across a source of electric potential, commutation circuit means comprising a saturable reactor and a commutating capacitor connected in series circuit relationship across the turn on, non-gate turn off controlled bidirectional conducting device for commutating off the device at desired intervals, the commutating capacitor and the saturated inductance of the saturable reactor being tuned to series resonance at a desired commutating frequency, gating circuit means operatively coupled to the turn on, non-gate turn off controlled conducting device to cause it to turn on and conduct current therethrough in either one of two directions dependent upon the polarity of the potentials across the device, and blocking circuit means operatively connected between the gating circuit means and the commutation circuit means for rendering said gating circuit means ineffective during the commutating intervals of said commutation circuit means.

2. An improved power circuit using turn on, non-gate turn off controlled conducting devices including in combination a non-gate turn on, non-gate turn off semiconductor controlled conducting device operatively coupled across a pair of power supply terminals that in turn are adapted to be connected across a source of electric potential, gating circuit means operatively coupled across the non-gate turn on, non-gate turn off semiconductor controlled conducting device for turning on the device and causing it to conduct current, commutation circuit means operatively coupled across the non-gate turn on, non-gate turn off semiconductor controlled conducting device for commutating the device off at desired intervals, the commutation circuit means being comprised by a saturable reactor and a commutating capacitor connected in series circuit relationship across the non-gate turn on, non-gate turn off semiconductor controlled conducting device with the commutating capacitor and the saturated inductance of the saturable reactor being tuned to series resonance at a desired commutating frequency, and blocking circuit means operatively connected between the gating circuit means and the commutation circuit means for rendering the gating circuit means ineffective during the commutating intervals of the commutation circuit means.

3. An improved power circuit using turn on, non-gate turn off solid state semiconductor controlled conducting devices including in combination a load current carrying gate turn on, non-gate turn off silicon controlled rectifier device and a load effectively connected in series circuit relationship across a pair of power supply terminals that in turn are adapted to be connected across a source of electric potential, first commutation circuit means comprising a first saturable reactor and a first commutating capacitor connected in series circuit relationship across the load current carrying SCR, a filter inductance connected in series circuit relationship with the load intermediate the load and the load current carrying SCR, a coasting gate turn on, non-gate turn off triac bi-directional conducting device connected across the series connected filter inductance and load, second commutation circuit means comprising a second saturable reactor and a second commutating capacitor connected in series circuit relationship across the coasting triac device, first gating circuit means operatively connected to the control gate of the load current carrying SCR for turning on the SCR; second gating circuit means operatively connected to the control gate of the coasting triac device for turning on the triac device to cause it to conduct current in either one of two directions depending upon the polarity of the potentials across the triac; and blocking circuit means operatively interconnected between the second gating circuit means and the second commutation circuit means for rendering the second gating circuit means ineffective during the commutating intervals of the second commutation circuit means.

4. An improved power circuit using turn on, non-gate turn off solid state semiconductor controlled conducting devices including in combination a load current carrying gate turn on, non-gate turn off triac controlled bi-directional conducting device and a load effectively connected in series circuit relationship across a pair of power supply terminals that in turn are adapted to be connected across a source of electric potential, gating circuit means operatively connected to the control gate of the load current carrying triac device for gating on the triac device to cause it to conduct current in either one of two directions depending upon the polarity of the potentials across the device, commutation circuit means comprising a saturable reactor and a commutating capacitor connected in series circuit relationship across the load current carrying triac device, the commutating capacitor and the saturated inductance of the saturable reactor being tuned to series resonance at a desired commutating frequency, and blocking circuit means operatively connected between the gating circuit means and the commutation circuit means for rendering said gating circuit means inoperative during the commutation intervals.

5. An improved power circuit using turn on, non-gate turn off solid state semiconducting devices including in combination a load current carrying gate turn on, non-gate turn off triac controlled conducting device, a filter inductance, and a load operatively connected in series circuit relationship across a pair of power supply terminals that in turn are adapted to be connected across a source of electric potential, first gating circuit means operatively connected to the control gate of the load current carrying triac device for turning on the device to cause it to conduct current in either one of two directions depending upon the polarity of the potentials applied across the device, first commutation circuit means comprising a first saturable reactor and a first commutating capacitor connected in series circuit relationship across the load current carrying triac device tuned to series resonance at a desired commutating frequency, first blocking circuit means interconnecting the first gating circuit means and the first commutation circuit means for rendering said first gating circuit means ineffective during the commutation intervals of said first commutation circuit means, a coasting gate turn on, non-gate turn off triac controlled conducting device connected in parallel circuit relationship with the filter inductance and the load, second gating circuit means operatively connected to the control gate of said coasting triac device for turning on the coasting triac device to cause it to conduct current in either one of two directions depending upon the polarity of the potentials across the device, second commutation circuit means comprising a second saturable reactor and a second commutating capacitor connected in series circuit relationship across the coasting triac device and tuned to series resonance at the desired commutating frequency, and second blocking circuit means interconnecting the second commutation circuit means and the second gating circuit means for rendering the second gating circuit means ineffective during the commutation intervals of the second commutation circuit means.

6. An improved power circuit using gate turn on, non-gate turn off solid state conducting devices including in combination a load current carrying gate turn on, non-gate turn off triac controlled conducting device and a load operatively connected in series circuit relationship across a pair of power supply terminals which in turn are adapted to be connected across a source of electric potential, gating circuit means operatively coupled to the control gate of said triac controlled conducting device for turning on said triac device to cause it to conduct current in either one of two directions depending upon the polarity of the potential across the device, commutation circuit means comprising a first saturable reactor and a commutating capacitor connected in series circuit relationship across the load current carrying triac device, the commutating capacitor and the saturated inductance of the saturable reactor being tuned to series resonance at a desired commutating frequency.

7. The combination set forth in claim 6 further characterized by a second saturable reactor operatively connected in parallel circuit relationship with the first saturable reactor and including a control winding for controlling the operation thereof.

8. An improved power circuit using gate turn on, non-gate turn off solid state conducting devices including in combination a load current carrying gate turn on, non-gate turn off triac controlled conducting device and a load operatively connected in series circuit relationship across a pair of power supply terminals which in turn are adapted to be connected across a source of electric potential, gating circuit means operatively coupled to the control gate of said triac controlled conducting device for turning on said triac device to cause it to conduct current, commutation circuit means comprising a first saturable reactor and a commutating capacitor connected in series circuit relationship across the load current carrying triac device, the commutating capacitor and the saturated inductance of the saturable reactor being tuned to series resonance at a desired commutating frequency, and blocking circuit means operatively coupled to said gating circuit means and to said commutation circuit means for rendering said gating circuit means ineffective during the commutation intervals of the commutation circuit means.

9. An improved power circuit using turn on, non-gate turn off solid state conducting devices including in combination a load current carrying gate turn on, non-gate turn off triac controlled conducting device and a load effectively coupled in series circuit relationship across a pair of power supply terminals that in turn are adapted to be connected across a source of electric potential, first gating circuit means operatively connected to the control gate of said triac device for turning on the device to cause it to conduct current at desired intervals in the load current carrying direction when the potential across the device has one polarity, second gating circuit means connected to the control gate of the triac device for turning on the device to cause it to conduct current in the opposite feedback direction whenever the potential across the device has the opposite polarity, commutation circuit means comprising a portion of a saturable reactor and a commutating capacitor connected in series circuit relationship across the load current carrying triac device, the said portion of the saturated inductance of the saturable reactor and the commutating capacitor being tuned to series resonance at a desired commutating frequency, with the remaining portion of the saturable reactor being connected in series circuit relationship with the load and the load current carrying triac and being inductively coupled to the first mentioned portion of the saturable reactor whereby the commutating capacitor is charged to a value dependent upon the value of the load current.

10. An improved power circuit using turn on, non-gate turn off solid state conducting devices including in combination a load current carrying turn on, non-gate turn off dv/dt fired SCR controlled conducting device having its gate open circuited and a load operatively connected in series circuit relationship across a source of electric potential, gating circuit means comprising a pulsing network operatively connected across said dv/dt fired SCR load current carrying device for turning on the device to cause it to conduct current therethrough, a feedback rectifier connected in parallel circuit relationship with the dv/dt fired SCR in a reversed polarity sense, commutation circuit means comprising a saturable reactor and a commutating capacitor connected in series circuit relationship across the load current carrying dv/dt fired SCR device, the commutating capacitor and the saturated inductance of the saturable reactor being tuned to series resonance at a desired commutating frequency, and a filter inductance connected intermediate the load current carrying dv/dt fired SCR device and the load, a coasting rectifier connected in parallel circuit relationship with the filter inductance and the load, and a second small saturable reactor interconnected between the load current carrying dv/dt fired SCR device and the juncture of the coasting rectifier and filter inductance for improving the operation of said gating circuit means pulsing network.

11. An improved power circuit using turn on, non-gate turn off solid state conducting devices including in combination a load current carrying turn on, non-gate turn off dv/dt fired SCR controlled conducting device having its gate open circuited and a load operatively connected in series circuit relationship across a pair of power supply terminals that in turn are adapted to be connected across a source of electric potential, a feedback rectifier operatively connected in parallel with the load current carrying dv/dt fired SCR device in a reverse polarity sense, first gating circuit means comprising a first pulsing network operatively connected across said load current carrying dv/dt fired SCR controlled conducting device for turning the device on to cause it to conduct current, first commutation circuit means comprising a first saturable reactor and a first commutating capacitor connected in series circuit relationship across the load current carrying dv/dt fired SCR controlled conducting device, a pumpback dv/dt fired SCR controlled conducting device having its gate open circuited operatively connected in parallel circuit relationship with the load, a coasting rectifier device operatively connected in parallel circuit relationship with the pumpback dv/dt fired SCR controlled conducting device in a reverse polarity sense, second gating circuit means comprising a second pulsing network operatively connected across said pumpback dv/dt fired SCR device for turning on the device to cause it to conduct current, and second commutation circuit means comprising a second saturable reactor and a second commutating capacitor connected in series circuit relationship across the pumpback dv/dt fired SCR controlled conducting device for commutating off the device at desired intervals.

12. An improved power circuit using turn on, non-gate turn off solid state conducting devices including in combination a load current carrying dv/dt fired SCR controlled conducting device having its gate open circuited and a load operatively connected in series circuit relationship across a pair of power supply terminals that in turn are adapted to be connected across a source of electric potential, gating circuit means comprising a first pulsing network operatively connected across the load current carrying dv/dt fired SCR controlled conducting device for turning the device on to cause it to conduct current, a feedback rectifier device connected in parallel circuit relationship with the load current carrying dv/dt fired SCR controlled conducting device in a reverse polarity sense, first commutation circuit means comprising a first saturable reactor and a first commutating capacitor connected in series circuit relationship across the load current carrying dv/dt fired SCR controlled conducting device for commutating the device off at desired intervals, a coasting gate turn on, non-gate turn off triac controlled conducting device operatively connected in parallel circuit relationship with the load, second gating circuit means operatively connected to the control gate of said coasting triac device for turning on the coasting triac device to cause it to conduct current in either one of two directions depending upon the polarity of the potentials across the device, second commutation circuit means comprising a second saturable reactor and a second commutating capacitor connected in series circuit relationship across the coasting triac controlled conducting device for commutating the device off at desired intervals, and blocking circuit means operatively connected between the second gating circuit means and the second commutation circuit means for rendering said second gating circuit means ineffective during the commutation intervals of said second commutation circuit means.

13. An improved power circuit using turn on, non-gate turn off solid state conducting devices including in combination a load current carrying non-gate turn on, non-gate turn off diac controlled conducting device and a load operatively connected in series circuit relationship across a pair of power supply terminals that in turn are adapted to be connected across a source of electric potential, gating circuit means comprising pulsing network means operatively connected across said load current carrying diac device for turning on the diac device to cause it to conduct current therethrough in either one of two directions depending upon the polarity of the potentials across the load current carrying diac device, commutation circuit means comprising a saturable reactor and a commutating capacitor connected in series circuit relationship across the load current carrying diac device, the commutating capacitor and the saturated inductance of the saturable reactor being tuned to series resonance at a desired commutating frequency, and blocking circuit means operatively interconnected between the commutation circuit means and the gating circuit means for rendering the gating circuit means inoperative during the commutating intervals of said commutation circuit means.

14. An improved power circuit using turn on, non-gate turn off solid state conducting devices including in combination a load current carrying turn on, non-gate turn off diac controlled conducting device and a load operatively connected in series circuit relationship across a pair of power supply terminals that in turn are adapted to be connected across a source of electric potential, first gating circuit means comprised by first pulse forming network means operatively connected across said load current carrying diac device for turning on said load current carrying device to cause it to conduct current therethrough in a first direction and second pulse forming network means operatively connected across said load current carrying diac device for turning on said diac device to cause it to conduct current therethrough in a reverse direction relative to the first direction depending upon the polarity of the potentials across the load current carrying diac device, first commutation circuit means comprised by a first saturable reactor and a first commutating capacitor connected in series circuit relationship across the load current carrying diac device for commutating off the device at desired intervals, first blocking circuit means interconnecting the first commutation circuit means and the second pulse forming network means for rendering said second pulse forming network means ineffective during the commutation intervals of the first commutation circuit means, a coasting turn on, non-gate turn off diac controlled conducting device operatively connected in parallel circuit relationship with the load, second gating circuit means comprised by third pulse forming network means operatively connected across said coasting diac device for turning on said coasting diac device to cause it to conduct current therethrough in one direction, and fourth pulse forming network means operatively connected across said coasting diac device for turning on said coasting diac device to cause it to conduct current therethrough in a reverse direction with respect to the one direction depending upon the polarity of the potentials across said coasting diac device, second commutation circuit means comprised by a second saturable reactor and a second commutating capacitor connected in series circuit relationship across the coasting diac device for commutating off the coasting diac device at desired intervals, and second blocking circuit means operatively interconnecting the second commutation circuit means and the fourth pulse forming network means for rendering the fourth pulse forming network means ineffective during the commutation intervals of the second commutation circuit means.

15. An improved power circuit using turn on, non-gate turn off solid state controlled conducting devices including in combination a load current carrying turn on, no-gate turn off diac controlled conducting device and a load operatively connected in series circuit relationship across a pair of power supply terminals that in turn are adapted to be connected across a source of electric potential, first gating circuit means comprised by first pulse forming network means operatively connected across the load current carrying diac device for turning on the diac device to cause it to conduct current in a first direction and second pulse forming network means operatively connected across said load current carrying diac device for turning on the load current carrying diac device to cause it to conduct current in a reverse direction with respect to the first direction depending upon the polarity of the potentials across the load current carrying diac device, first commutation circuit means comprised by a first saturable reactor and a first commutating capacitor connected in series circuit relationship across the load current carrying diac device, first blocking circuit means operatively interconnected between the first commutation circuit means and the second pulse forming network means for rendering the second pulse forming network means ineffective during the commutation intervals of the first commutation circuit means, a coasting gate turn on, non-gate turn off triac controlled conducting device operatively connected in parallel circuit relationship with the load, second gating circuit means operatively connected to the control gate of said coasting triac device for turning on the coasting triac device to cause it to conduct current in either direction therethrough depending upon the polarity of the potentials across the coasting triac device, second commutation circuit means comprised by a second saturable reactor and a second commutating capacitor connected in series circuit relationship across the coasting triac device, and second blocking circuit means operatively interconnected between the second commutation circuit means and the second gating circuit means for rendering the second gating circuit means ineffective during the commutation intervals of the second commutation circuit means.

16. An improved power circuit using turn on, non-gate turn off solid state controlled conducting devices including in combination a load current carrying gate turn on, non-gate turn off triac controlled conducting device and a load operatively connected in series circuit relationship across a pair of power supply terminals that in turn are adapted to be connected across a source of electric potential, first gating circuit means operatively connected to the control gate of the load current carrying triac device for turning on the load current carrying triac device to cause it to conduct current in either one of two directions depending upon the polarity of the potentials across the device, first commutation circuit means comprised by a first saturable reactor and a first commutating capacitor connected in series circuit relationship across the load current carrying triac device for commutating the device off at desired intervals, first blocking circuit means operatively interconnected between the first commutation circuit means and the first gating circuit means for rendering the first gating circuit means ineffective during the commutating intervals of the first commutation circuit means, a coasting turn on, non-gate turn off diac controlled conducting device connected in parallel circuit relationship with the load, second gating circuit means operatively connected across said coasting diac controlled conducting device for turning on the coasting diac device to cause it to conduct current therethrough in either one of two directions depending upon the polarity of the potentials across said coasting diac device, second commutation circuit means comprised by a second saturable reactor and a second commutating capacitor connected in series circuit relationship across the coasting diac device for commutating off the coasting diac device at desired intervals, and second blocking circuit means operatively interconnected between the second commutation circuit means and the second gating circuit means for rendering the second gating means ineffective during the commutating intervals of the second commutation circuit means.

17. An improved power circuit using gate turn on, non-gate turn off triac solid state bi-directional conducting devices including in combination two sets of series connected load current carrying triac solid state bi-directional conducting devices with each set being operatively connected in parallel circuit relationship across a pair of power supply terminals that in turn are adapted to be connected across a source of electrical potential, a load operatively connected between the juncture of each of the load current carrying triac devices in each set, gating circuit means operatively coupled to the control gate of each load current carrying triac device for gating on the triac device to cause it to conduct current in either direction through the device depending upon the polarity of the potentials across the device, and commutation circuit means connected across each load current carrying triac device for commutating off the device at desired intervals, the commutation circuit means comprising a saturable reactor and a commutating capacitor connected in series circuit relationship across each respective load current carrying triac bi-directional conducting device with the commutating capacitor and a saturated inductance of the saturable reactor being tuned to series resonance at a desired commutating frequency.

18. An improved power inverter circuit using gate turn on, non-gate turn off triac solid state bidirectional conducting devices including in combination two sets of series connected load current carrying triac solid state bidirectional conducting devices with each set being operatively connected in parallel circuit relationship across a pair of power supply terminals that in turn are adapted to be connected across a direct current power supply, a load operatively connected between the juncture of each of the load current carrying triac devices in each set, gating circuit means operatively coupled to the control gate of each load current carrying triac device for gating on the triac device to cause it to conduct current in either direction through the device depending upon the polarity of the potentials across the device, commutation circuit means connected across each load current carrying triac device for commutating off the device at desired intervals, the commutation circuit means comprising a saturable reactor and a commutating capacitor connected in series circuit relationship across each respective load current carrying triac bidirectional conducting device with the commutating capacitor and the saturated inductance of the saturable reactor being tuned to series resonance at a desired commutating frequency, and blocking circuit means interconnecting the gating circuit means and the commutation circuit means of each load current carrying triac device for rendering ineffective the gating circuit means during the commutation intervals of the commutation circuit means, and circuit means for isolating adjacent triac devices in the power inverter circuit.

19. An improved power circuit using turn on, non-gate turn off solid state dv/dt fired silicon controlled rectifier devices having their gates open circuited and feedback diodes connected in parallel circuit relationship with the individual load current carrying dv/dt fired silicon controlled rectifier devices in a reverse polarity sense, each set of series connnected load current carrying dv/dt fired silicon controlled rectifier devices and their parallel connected feedback diodes being operatively connected in parallel circuit relationship across a pair of power supply terminals that in turn are adapted to be connected across a direct current power supply, a load operatively connected between the juncture of each of the load current carrying silicon controlled rectifier devices in each set, gating circuit means operatively connected across each of the individual load current carrying dv/dt fired silicon controlled rectifier devices for turning on the device to cause it to conduct current in the load current carrying direction, commutation circuit means connected across each load current carrying silicon controlled rectifier device for commutating off the device at desired intervals, the commutation circuit means comprising a saturable reactor and a commutating capacitor connected in series circuit relationship across each load current carrying dv/dt fired silicon controlled rectifier device with the commutating capacitor and the saturated inductance of the saturable reactor being tuned to series resonance at a desired commutating frequency, and blocking circuit means interconnecting the gating circuit means and the commutation circuit means of each load current carrying dv/dt silicon controlled rectifier device for rendering ineffective the gating circuit means during the commutation intervals of the commutation circuit means.

20. An improved power circuit using turn on, non-gate turn off diac solid state bi-directional conducting devices including in combination two sets of series connected load current carrying diac solid state bi-directional conducting devices with each set being operatively connected in parallel circuit relationship across a pair of power supply terminals that in turn are adapted to be connected across a source of electrical potential, a load operatively connected between the juncture of each of the load current carrying diac devices in each set, gating circuit means operatively connected across each individual load current carrying diac device for turning on the device to cause it to conduct current in either direction through the device depending upon the polarity of the potentials across the device, and commutation circuit means connected across each load current carrying diac device for commutating off the device at desired intervals, the commutation circuit means comprising a saturable reactor and a commutating capacitor connected in series circuit relationship across each respective load current carrying diac device with the commutating capacitor and the saturated inductance of the saturable reactor being tuned to series resonance at the desired commutating frequency.

21. An improved power inverter circuit using turn on, non-gate turn off diac solid state bi-directional conducting devices including in combination two sets of series connected load current carrying diac solid state bi-directional conducting devices with each set being operatively connected in parallel circuit relationship across a pair of power supply terminals that in turn are adapted to be connected across a direct current power supply, a load operatively connected between the juncture of each of the load current carrying diac devices in each set, gating circuit means operatively connected across each individual load current carrying diac device for turning on the device to cause it to conduct current in either direction through the device depending upon the polarity of the potentials across the device, commutation circuit means connected across each load current carrying diac device for commutating off the device at desired intervals, the commutation circuit means comprising a saturable reactor and a commutating capacitor connected in series circuit relationship across each respective load current carrying diac device with the commutating capacitor and the saturated inductance of the saturable reactor being tuned to series resonance at a desired commutating frequency, and blocking circuit means interconnecting the gating circuit means and the commutation circuit means of the individual load current carrying diac devices for rendering ineffective the gating circuit means during the commutation intervals of the commutation circuit means, and circuit means for isolating the adjacent load current carrying diacs in the power inverter circuit.

22. An improved power circuit using gate turn on, non-gate turn off solid state conductivity controlled devices including in combination two pairs of series connected load current carrying solid state bi-directional conductivity controlled conducting means with each pair being operatively connected across a source of electric potential, a load operatively connected between the juncture of each of the bi-directional conducting means in each pair, gating circuit means operatively coupled to each bi-directional conducting means for gating on the bi-directional conducting means to cause it to conduct current in either direction therethrough depending upon the polarity of the potentials thereacross, commutation circuit means connected across each bi-directional conducting means for commutating off the bi-directional conducting means at desired intervals, the commutation means comprising a saturable reactor and a commutating capacitor connected in series circuit relationship across each bi-directional conducting means with the commutating capacitor and the saturated inductance of the saturable reactor being tuned to series resonance at a desired commutating frequency, and blocking circuit means interconnecting each gating circuit means and its respective commutation circuit means for rendering ineffective the gating circuit means during the commutation intervals of the commutation circuit means.

References Cited
UNITED STATES PATENTS

| | | | |
|---|---|---|---|
| 3,019,355 | 1/1962 | Morgan | 307—88.5 |
| 3,103,616 | 9/1963 | Cole et al. | 321—45 |
| 3,128,396 | 4/1964 | Morgan | 307—88.5 |
| 3,164,767 | 1/1965 | Morgan | 321—45 X |
| 3,196,330 | 7/1965 | Moyson | 317—235 |
| 3,257,604 | 6/1966 | Colclaser et al. | 321—45 |

JOHN F. COUCH, *Primary Examiner.*

W. M. SHOOP, *Assistant Examiner.*